US009529076B2

(12) United States Patent
Subramanian et al.

(10) Patent No.: US 9,529,076 B2
(45) Date of Patent: Dec. 27, 2016

(54) SYSTEMS AND METHODS FOR DETERMINING LOCATIONS OF WIRELESS SENSOR NODES IN AN ASYMMETRIC NETWORK ARCHITECTURE

(71) Applicants: Vivek Subramanian, Orinda, CA (US);
Elad Alon, El Cerrito, CA (US);
Vikram Pavate, Foster City, CA (US)

(72) Inventors: Vivek Subramanian, Orinda, CA (US);
Elad Alon, El Cerrito, CA (US);
Vikram Pavate, Foster City, CA (US)

(73) Assignee: Dragonfly Technology Inc., San Bruno, CA (US)

( * ) Notice: Subject to any disclaimer, the term of this patent is extended or adjusted under 35 U.S.C. 154(b) by 0 days.

(21) Appl. No.: 14/607,050

(22) Filed: Jan. 27, 2015

(65) Prior Publication Data
US 2016/0216362 A1    Jul. 28, 2016

(51) Int. Cl.
*H04W 24/00* (2009.01)
*G01S 5/10* (2006.01)
(Continued)

(52) U.S. Cl.
CPC .................. *G01S 5/10* (2013.01); *H04W 4/02* (2013.01); *H04W 56/001* (2013.01); *H04W 84/18* (2013.01)

(58) Field of Classification Search
USPC ...................................... 455/456.5
See application file for complete search history.

(56) References Cited

U.S. PATENT DOCUMENTS 7,515,556 B2    4/2009  Hui et al.
7,548,576 B2    6/2009  Dowla et al.
(Continued)

FOREIGN PATENT DOCUMENTS

WO    WO-2010143756    12/2010

OTHER PUBLICATIONS

Akyildiz, Ian F., et al., "Wireless mesh networks: a survey", *Computer networks 47*, No. 4 (2005): pp. 445-487.
(Continued)

*Primary Examiner* — Joel Ajayi
(74) *Attorney, Agent, or Firm* — Blakely, Sokoloff, Taylor and Zafman LLP

(57) ABSTRACT

Systems and methods for determining location information for sensor nodes in a wireless asymmetric network are disclosed herein. In one embodiment, an apparatus (e.g., hub) for providing a wireless asymmetric network architecture includes a memory for storing instructions, one or more processing units to execute instructions to establish and control communications in a wireless asymmetric network architecture, and radio frequency (RF) circuitry including multiple antennas to transmit and receive communications in the wireless asymmetric network architecture. The RF circuitry may include multiple antennas to transmit communications to a plurality of sensor nodes each having a wireless device with a transmitter and a receiver to enable bi-directional communications with the RF circuitry of the apparatus in the wireless asymmetric network architecture. The one or more processing units are configured to execute instructions to determine location information for the plurality of sensor nodes based on receiving communications from each sensor node.

20 Claims, 21 Drawing Sheets

(51) Int. Cl.
  H04W 4/02    (2009.01)
  H04W 56/00   (2009.01)
  H04W 84/18   (2009.01)

(56) References Cited

U.S. PATENT DOCUMENTS

| | | | |
|---|---|---|---|
| 7,574,221 | B2 | 8/2009 | Guvenc et al. |
| 7,962,150 | B2 | 6/2011 | Hertzog et al. |
| 8,009,602 | B2 | 8/2011 | Hui et al. |
| 8,121,080 | B2 | 2/2012 | Ham et al. |
| 8,289,159 | B2 | 10/2012 | Julian et al. |
| 8,478,292 | B2 | 7/2013 | Kim et al. |
| 8,886,229 | B2 * | 11/2014 | Nanda ............... G01D 21/00 370/310.2 |
| 2003/0037033 | A1 | 2/2003 | Nyman et al. |
| 2003/0063585 | A1 | 4/2003 | Younis |
| 2005/0141465 | A1 * | 6/2005 | Kato ............... H04W 40/00 370/337 |
| 2007/0217379 | A1 | 9/2007 | Fujiwara et al. |
| 2008/0298796 | A1 | 12/2008 | Kuberka et al. |
| 2008/0309481 | A1 | 12/2008 | Tanaka |
| 2009/0204265 | A1 | 8/2009 | Hackett |
| 2010/0075704 | A1 | 3/2010 | McHenry et al. |
| 2010/0110888 | A1 | 5/2010 | Park et al. |
| 2011/0298598 | A1 | 12/2011 | Rhee |
| 2013/0170378 | A1 | 7/2013 | Ray et al. |
| 2014/0361928 | A1 * | 12/2014 | Hughes ............... G01S 19/48 342/463 |
| 2015/0077241 | A1 | 3/2015 | Contestabile et al. |
| 2015/0079933 | A1 | 3/2015 | Smith et al. |

OTHER PUBLICATIONS

Anastasi, Giuseppe, et al., "Energy conservation in wireless sensor networks: A survey", *Ad Hoc Networks 7*, No. 3 (2009): pp. 537-568.

Baghaei-Nejad, Majid, et al., "Low cost and precise localization in a remote-powered wireless sensor and identification system", *Electrical Engineering (ICEE), 2011 19th Iranian Conference on*, pp. 1-5. IEEE, May 17-19, 2011.

Buratti, Chiara, et al., "An overview on wireless sensor networks technology and evolution", *Sensors 9*, No. 9 (2009): pp. 6869-6896.

Cohn, Gabe, et al., "SNUPI: Sensor Nodes Utilizing Powerline Infrastructure", *UbiComp '10*, Sep. 26-29, 2010, Copenhagen, Denmark, 10 pages.

Darif, Anouar, et al., "Performance Evaluation of IR-UWB Compared to Zigbee in Real time Applications for Wireless Sensor Networks", *Journal of Convergence Information Technology 8*, No. 15 (2013).

Doherty, Lance, et al., "Convex position estimation in wireless sensor networks", *INFOCOM 2001. Twentieth Annual Joint Conference of the IEEE Computer and Communications Societies, Proceedings, IEEE*, vol. 3, pp. 1655-1663. IEEE, 2001.

Gezici, Sinan, et al., "Localization via ultra-wideband radios: a look at positioning aspects for future sensor networks", *Signal Processing Magazine, IEEE 22*, No. 4. (2005): pp. 70-84.

Gutierrez, Jose A., et al., "IEEE 802.15. 4: a developing standard for low-power low-cost wireless personal area networks", *network, IEEE 15*, No. 5 (2001): pp. 12-19.

Kellogg, Bryce, et al., "Wi-Fi Backscatter: Internet connectivity for RF-powered devices", *Proceedings of the 2014 ACM conference on SIGCOMM*, pp. 607-618. ACM, 2014.

Kinney, Patrick, et al., "technology: Wireless control that simply works", *Communications design conference*, vol. 2. 2003.

Lee, Jin-Shyan, et al., "A comparative study of wireless protocols: Bluetooth, UWB, ZigBee, and Wi-Fi", *Industrial Electronics Society, 2007. IECON 2007. 33rd Annual Conference of the IEEE*, pp. 46-51. IEEE, 2007.

Lee, Myung J., et al., "Emerging standards for wireless mesh technology", *Wireless Communications, IEEE 13*, No. 2 (2006): pp. 56-63.

Mamechaoui, Sarra, et al., "A survey on energy efficiency for wireless mesh network", *arXiv preprint arXiv:1304.3904 (2013)*.

Paradiso, Joseph A., et al., "Energy scavenging for mobile and wireless electronics", *Pervasive Computing, IEEE 4*, No. 1 (2005): pp. 18-27.

Patwari, Neal, et al., "Locating the nodes: cooperative localization in wireless sensor networks", *Signal Processing Magazine, IEEE 22*, No. 4 (2005): pp. 54-69.

Savarese, Chris, et al., "Location in distributed ad-hoc wireless sensor networks", *Acoustics, Speech, and Signal Processing, 2001. Proceedings.(ICASSP '01). 2001 IEEE International Conference on*, vol. 4, pp. 2037-2040. IEEE, 2001.

Schmid, Thomas, et al., "Disentangling wireless sensing from mesh networking", *Proceedings of the 6th Workshop on Hot Topics in Embedded Networked Sensors*, p. 3. ACM, Jun. 28, 2010.

Sugano, Masashi, et al., "Low-Energy-Consumption Ad Hoc Mesh Network Based on Intermittent Receiver-driven Transmission", *ICGST-CNIR Journal*, vol. 9, Issue 1, Jul. 2009, 8 pages.

Vullers, Ruud J., et al., "Energy harvesting for autonomous wireless sensor networks", *Solid-State Circuits Magazine, IEEE 2*, No. 2 (2010): pp. 29-38.

Ahmed, Khawza I., et al., "Improving Two-Way Ranging Precision with Phase-offset Measurements", *In Global Telecommunications Conference, 2006. GLOBECOM3 06. IEEE* (pp. 1-6). IEEE.

Farnsworth, Bradley, et al., "High Precision Narrow-Band RF Ranging", *In Proceedings of the 2010 International Technical Meeting of the Institute of Navigation* (pp. 161-166).

Farnsworth, Bradley, et al., "High-precision 2.4 GHz DSSS RF ranging", *Proceedings of the 2011 International Technical Meeting of the Institute of Navigation*. 2011, 6 pages.

Farnsworth, Bradley D., et al., "Precise, Accurate, and Multipath-Resistant Networked Round-Trip Carrier Phase RF Ranging", *Proceedings of the 2015 International Technical Meeting of the Institute of Navigation*, Dana Point, California, Jan. 2015, pp. 651-656.

Franceschini, Fiorenzo, et al., "A review of localization algorithms for distributed wireless sensor networks in manufacturing", *International journal of computer integrated manufacturing 22*, No. 7 (2009): 698-716.

Jin, H. H., "Scalable sensor localization algorithms for wireless sensor networks", *Doctoral dissertation, University of Toronto*, 2005, 106 pages.

Karalar, Tufan, et al., "Implementation of a Localization System for Sensor Networks", (No. UCB/EECS-2006-69). *California Univ Berkeley Dept of Electrical Engineering and Computer Science*, May 18, 2006, 173 pages.

Konig, S., et al., "Precise time of flight measurements in IEEE 802.11 networks by cross-correlating the sampled signal with a continuous Barker code", *In Mobile Adhoc and Sensor Systems (MASS), 2010 IEEE 7th International Conference on*, pp. 642-649. IEEE, 2010.

Lanzisera, Steven, et al., "RF Ranging for Location Awareness", *Doctoral dissertation, University of California, Berkeley*, May 19, 2009, 103 pages.

Lanzisera, Steven, et al., "RF Time of Flight Ranging for Wireless Sensor Network Localization", *Intelligent Solutions in Embedded Systems, 2006 International Workshop on*, vol., No., pp. 1,12, Jun. 30-30, 2006.

Makki, A., et al., "High-resolution time of arrival estimation for OFDM-based transceivers", *Electronics Letters 51*, No. 3 (2015), pp. 294-296.

Mao, Guoqiang, et al., "Localization Algorithms and Strategies for Wireless Sensor Networks", *IGI Global, 2009*.

Pahlavan, Kaveh, et al., "Indoor Geolocation Science and Technology", *Communications Magazine, IEEE 40*, No. 2 (2002): 112-118.

Planas, Andreu U., "Signal processing techniques for wireless locationing", *Barcelona, Technical University of Catalonia (2006)*.

Song, Liang, et al., "Matrix pencil for positioning in wireless ad hoc sensor network", *In Wireless Sensor Networks*, pp. 18-27. Springer Berlin Heidelberg, 2004.

Vasisht, Deepak, et al., "Sub-Nanosecond Time of Flight on Commercial Wi-Fi Cards", *arXiv preprint arXiv:1505.03446 (2015)* 14 pages.

(56) References Cited

OTHER PUBLICATIONS

Vera, Jesus S., "Efficient Multipath Mitigation in Navigation System", Ph. D. dissertation, *Universitat Politecnica de Catalunya.* Dec. 9, 2003, 158 pages.

Wibowo, Sigit B., et al., "Time of flight ranging using off-the-self ieee802. 11 wifi tags", *Proceedings of the International Conference on Positioning and Context-Awareness (PoCA'09).* 2009, 5 pages.

Yang, Zheng, et al., "From RSSI to CSI: Indoor localization via channel response", *ACM Computing Surveys (CSUR)* 46, No. 2 (2013), article 25, 32 pages.

\* cited by examiner

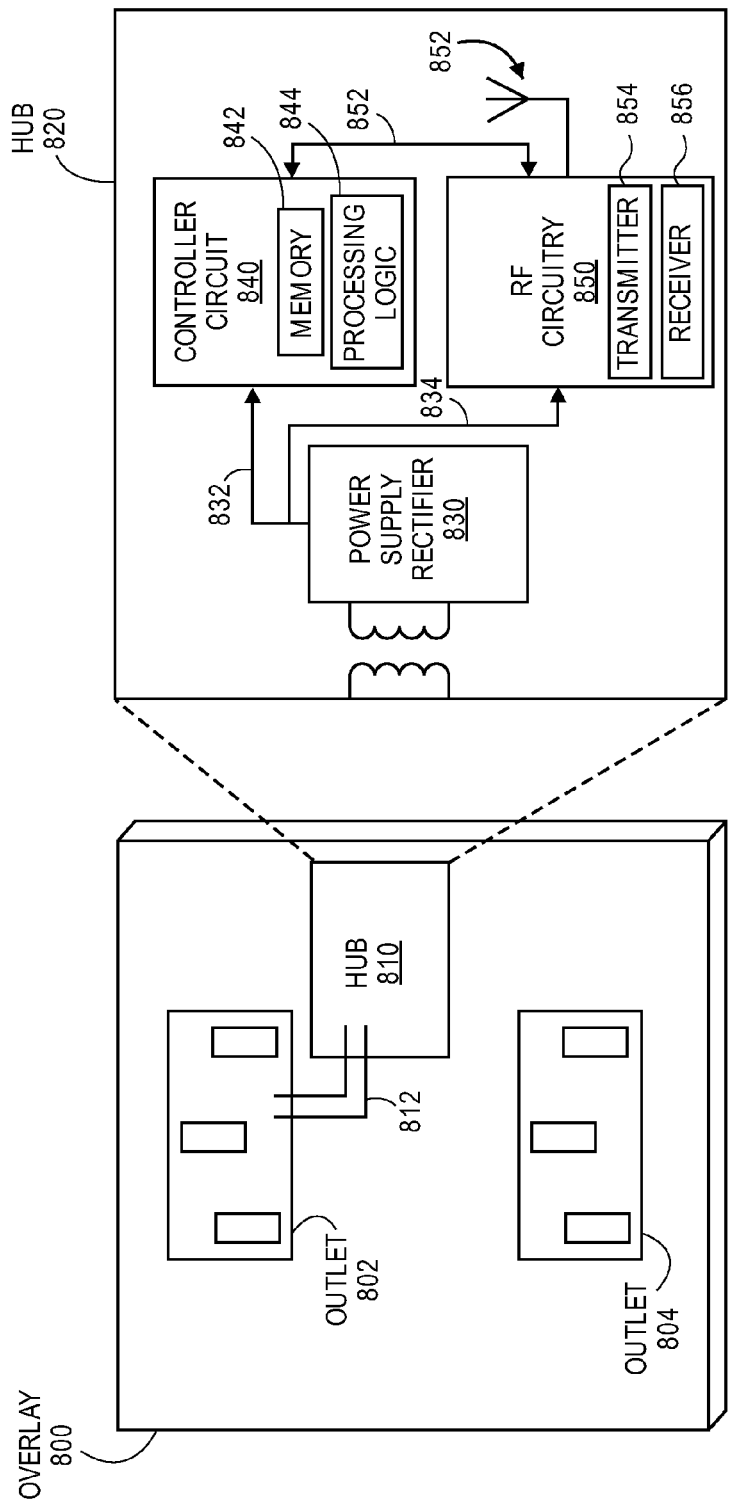

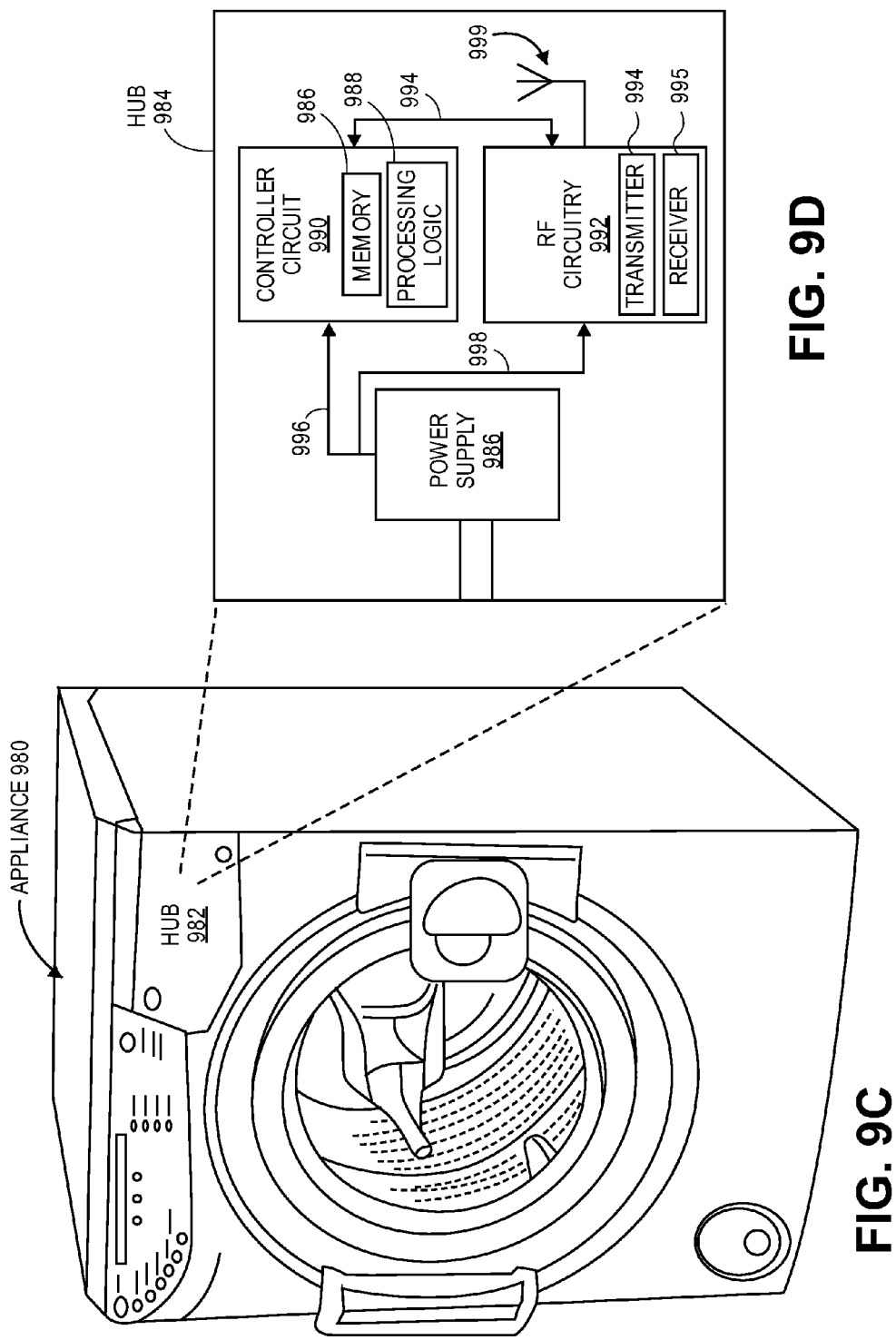

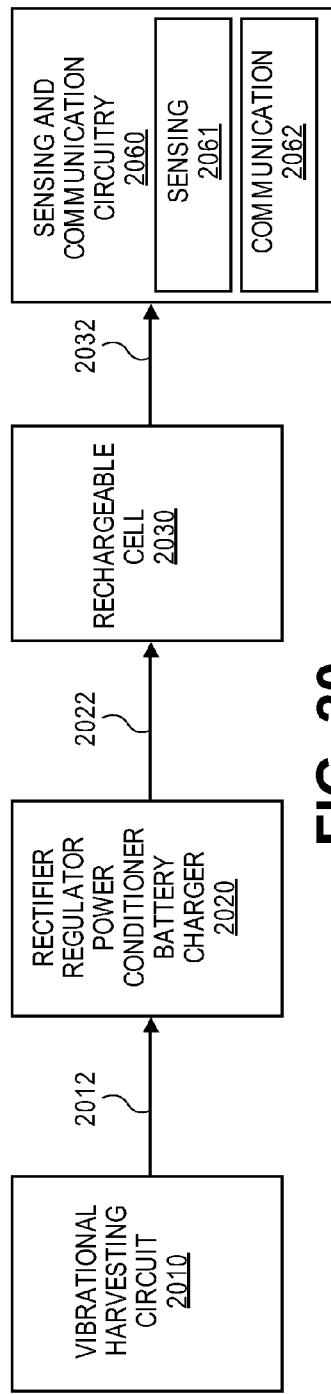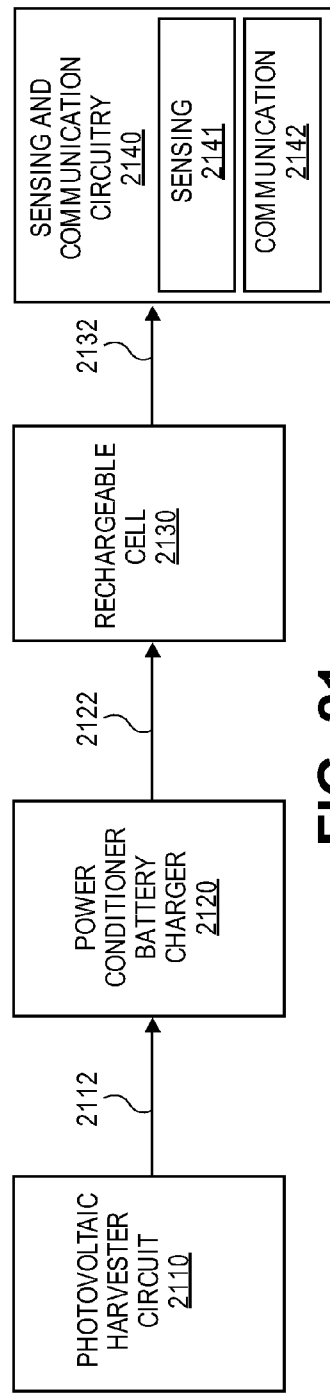

SYSTEMS AND METHODS FOR DETERMINING LOCATIONS OF WIRELESS SENSOR NODES IN AN ASYMMETRIC NETWORK ARCHITECTURE

RELATED APPLICATIONS

This application is related to application Ser. No. 14/607,045, filed Jan. 27, 2015, entitled: SYSTEMS AND METHODS FOR PROVIDING WIRELESS SENSOR NETWORKS WITH AN ASYMMETRIC NETWORK ARCHITECTURE; application Ser. No. 14/607,047 filed Jan. 27, 2015, entitled: SYSTEMS AND METHODS FOR PROVIDING WIRELESS ASYMMETRIC NETWORK ARCHITECTURES OF WIRELESS DEVICES WITH ANTI-COLLISION FEATURES; and application Ser. No. 14/607,048, filed Jan. 27, 2015, entitled: SYSTEMS AND METHODS FOR PROVIDING WIRELESS ASYMMETRIC NETWORK ARCHITECTURES OF WIRELESS DEVICES WITH POWER MANAGEMENT FEATURES.

FIELD

Embodiments of the invention pertain to systems and methods for determining locations of wireless sensor nodes in an asymmetric network architecture.

BACKGROUND

In the consumer electronics and computer industries, wireless sensor networks have been studied for many years. In archetypal wireless sensor networks, one or more sensors are implement in conjunction with a radio to enable wireless collection of data from one or more sensor nodes deployed within a network. Each sensor node may include one or more sensors, and will include a radio and a power source for powering the operation of the sensor node.

Wireless conventional sensor networks suffer from certain deficiencies that affect their operation, efficiency, cost, and ability to be implemented in indoor environments.

SUMMARY

For one embodiment of the present invention, a system with power management features for providing a wireless asymmetric network is disclosed herein. The system includes a hub having a wireless control device that is configured to control communications and power consumption in the wireless asymmetric network architecture. The system also includes a plurality of nodes each having a wireless device with a transmitter and a receiver to enable bi-directional communications with the wireless control device of the hub in the wireless asymmetric network architecture. The wireless control device can be configured to determine a scheduled timing of causing the transmitter to be operable to transmit and causing the receiver to be operable to receive for each wireless device to reduce power consumption of the wireless devices of the plurality of nodes.

In another embodiment, a system for providing a wireless asymmetric network architecture with anti-collision features includes a first hub having a wireless control device that is configured to control communications in the wireless asymmetric network architecture and a first plurality of nodes each having a wireless device with a transmitter and a receiver to enable bi-directional communications with the wireless control device of the first hub in the wireless asymmetric network architecture. The wireless control device of the first hub is configured to detect a communication from a first node of the first plurality of nodes, determine whether at least a portion of the communication is unintelligible to circuitry of the first hub or circuitry coupled to the first hub, and determine whether a collision of communications transmitting at approximately the same time from the first node and a second node has likely occurred when the at least portion of the communication is unintelligible.

The system may also include a second hub having a wireless control device that is configured to control communications in the wireless asymmetric network architecture and a second plurality of nodes each having a wireless device with a transmitter and a receiver to enable bi-directional communications with the wireless control device of the second hub in the wireless asymmetric network architecture. The wireless control device of the second hub is configured to determine a transmit window for a transmitter and a receive window for a receiver of each wireless device of the second plurality of nodes and provide anti-collision features to avoid collisions of the communications received from the wireless devices of the second plurality of nodes.

In another embodiment, a system for providing a wireless asymmetric network architecture includes power management features. The system includes a hub having a wireless control device that is configured to control communications and power consumption in the wireless asymmetric network architecture and a plurality of sensor nodes each having at least one sensor and a wireless device with a transmitter and a receiver to enable bi-directional communications with the wireless control device of the hub in the wireless asymmetric network architecture. The wireless control device is configured to determine a scheduled timing of operating each sensor node during a first time period that is close in time with respect to a transmit window of the transmitter and during a second time period that is close in time with respect to a receive window of the receiver for each wireless device to reduce power consumption of the wireless devices of the plurality of sensor nodes.

In one example, each sensor node operates at a first power consumption level for the first and second time periods. Each sensor node may operate at a second power consumption level when outside of the first and second time periods. For this example, the first power consumption level has more power consumption than the second power consumption level.

In another embodiment, an apparatus (e.g., hub) for providing a wireless asymmetric network architecture includes a memory for storing instructions, one or more processing units to execute instructions to establish and control communications in a wireless asymmetric network architecture, and radio frequency (RF) circuitry including multiple antennas to transmit and receive communications in the wireless asymmetric network architecture. The RF circuitry may include multiple antennas to transmit communications to a plurality of sensor nodes each having a wireless device with a transmitter and a receiver to enable bi-directional communications with the RF circuitry of the apparatus in the wireless asymmetric network architecture. The one or more processing units are configured to execute instructions to determine location information for the plurality of sensor nodes based on receiving communications from each sensor node.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 8A shows an exemplary embodiment of a hub implemented as an overlay 800 for an electrical power outlet in accordance with one embodiment.

FIG. 8B shows an exemplary embodiment of an exploded view of a block diagram of a hub 820 implemented as an overlay for an electrical power outlet in accordance with one embodiment.

FIG. 9C shows an exemplary embodiment of a hub implemented within an appliance (e.g., smart washing machine, smart refrigerator, smart thermostat, other smart appliances, etc.) in accordance with one embodiment.

FIG. 9D shows an exemplary embodiment of an exploded view of a block diagram of a hub 984 implemented within an appliance (e.g., smart washing machine, smart refrigerator, smart thermostat, other smart appliances, etc.) in accordance with one embodiment.

FIG. 20 illustrates a block diagram of a vibrational energy harvesting system for charging a rechargeable battery of a sensor node in accordance with another embodiment.

FIG. 21 illustrates a block diagram of a photovoltaic energy harvesting system for charging a rechargeable battery of a sensor node in accordance with one embodiment.

DETAILED DESCRIPTION

Figure 1:
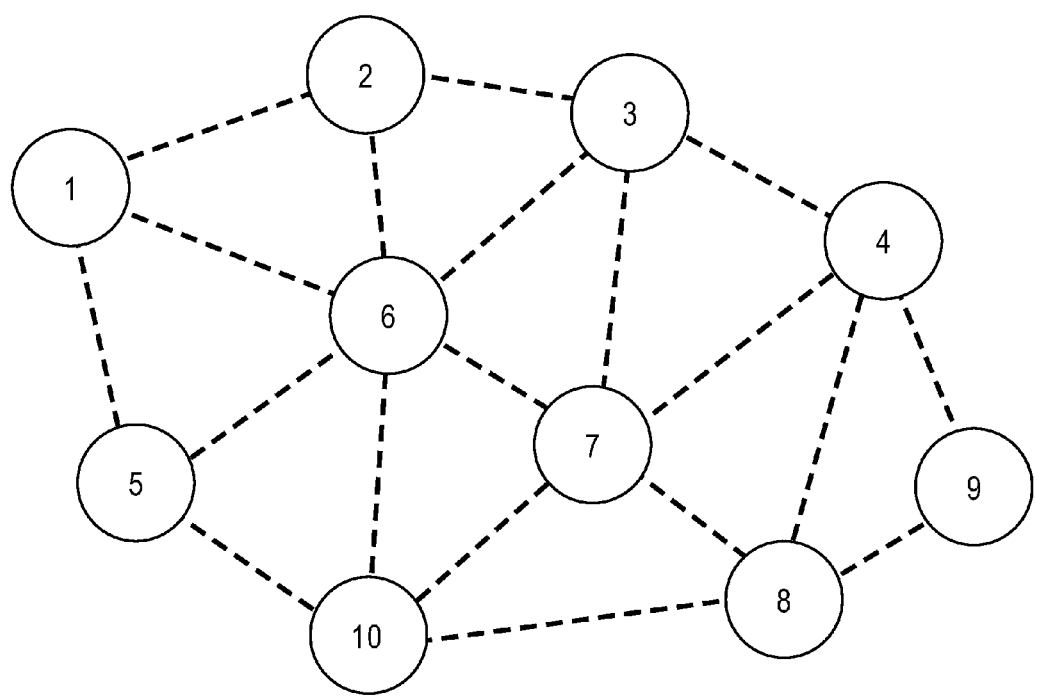
FIG. 1 shows an archetypal mesh-type wireless sensor network.

Systems and methods for determining location information for sensor nodes in a wireless asymmetric network are disclosed herein. In one embodiment, an apparatus (e.g., hub) for providing a wireless asymmetric network architecture includes a memory for storing instructions, one or more processing units to execute instructions to establish and control communications in a wireless asymmetric network architecture, and radio frequency (RF) circuitry including multiple antennas to transmit and receive communications in the wireless asymmetric network architecture. The RF circuitry may include multiple antennas to transmit communications to a plurality of sensor nodes each having a wireless device with a transmitter and a receiver to enable bi-directional communications with the RF circuitry of the apparatus in the wireless asymmetric network architecture. The one or more processing units are configured to execute instructions to determine location information for the plurality of sensor nodes based on receiving communications from each sensor node.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances. Additional aspects of embodiments of the invention provide ability to achieve sensor localization, collision avoidance, mitigation of self-discharge, and implementation of energy harvesting.

Embodiments of the invention provide advantages in power management such as providing a wireless sensor network for use in indoor and nearby exterior environments with enhanced battery life. The asymmetry of available power in indoor and nearby exterior environments is exploited to enhance battery life and communication range in wireless sensor networks deployed in such environments.

Embodiments of the invention exploit the use of low-duty cycle networking to reduce transmission-related energy consumption in a wireless sensor network for use in indoor and nearby exterior environments, thus providing improved battery life.

Anti-collision features provide a means of avoiding communication collisions in a wireless sensor network for use in indoor and nearby exterior environments without expending excessive energy on communications associated with collision avoidance.

Sensor localization features provide a wireless sensor network offering precise localization of individual sensor nodes in indoor and nearby exterior environments.

Energy scavenging features provide a wireless sensor network for use in indoor and nearby exterior environments with battery-optimized energy scavenging.

Embodiments of the invention provide a battery-operated sensor node architecture offering robust communication and long battery life within indoor and similar environments, along with ability to precisely determine location of the sensor node within the physical environment of the wireless sensor network.

Figure 2:
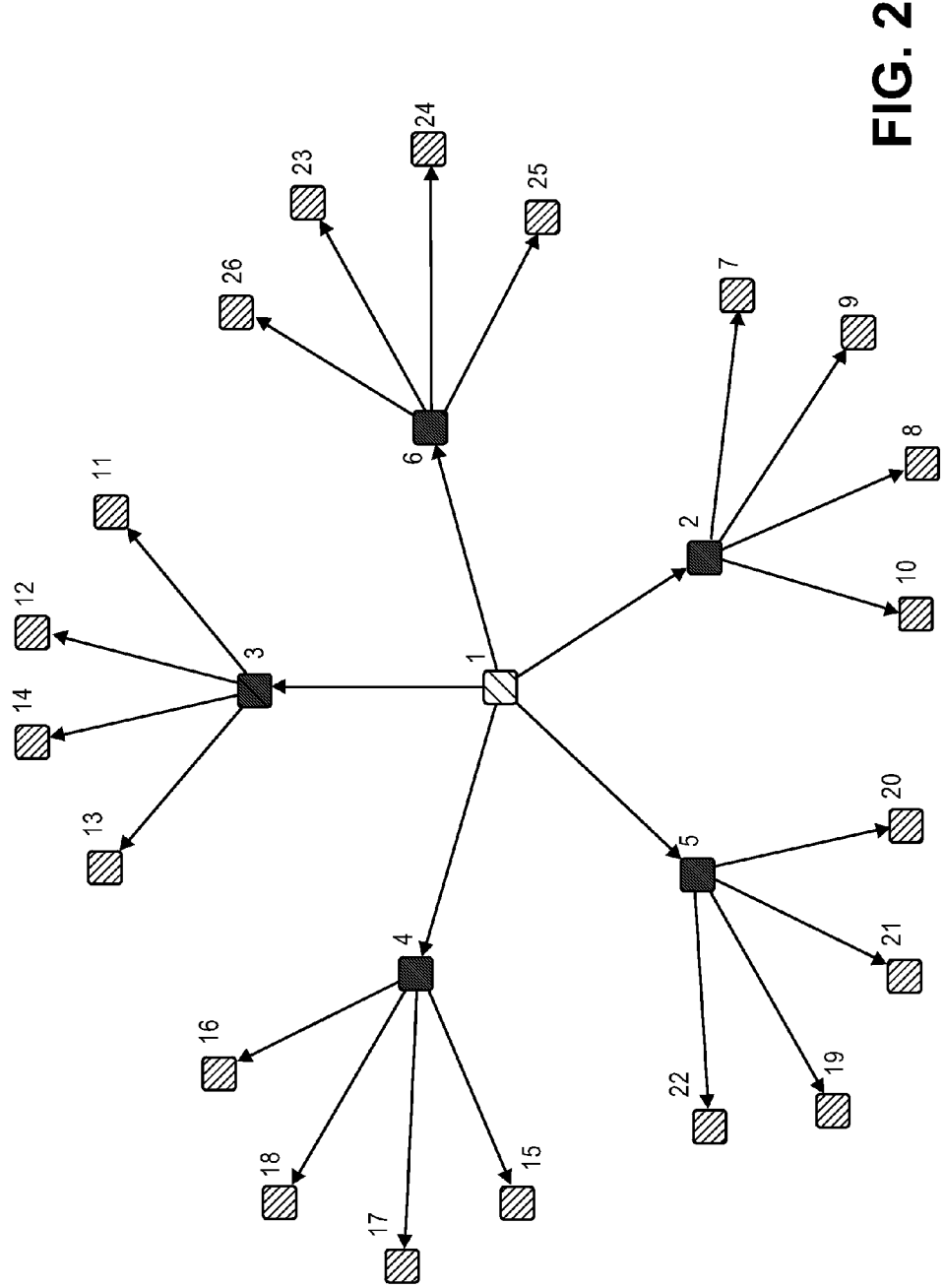
FIG. 2 shows an archetypal tree-type wireless sensor network.

Conventional wireless sensor networks make use of a variety of communication and power supply schemes. In one communication scheme, a mesh network is used, where sensor nodes within the wireless sensor networks act as routers. In this scheme, each node can send data originating within itself, can receive data from other nodes or devices, and can route data received from other nodes or devices on to still other nodes or devices. In this last manner, the sensor node behaves as a repeater, in that it passes on data not originating within itself. FIG. 1 shows a schematic representation of a wireless sensor network implemented as a mesh network. Each of the nodes 1-10 can send data originating within itself, can receive data from other nodes or devices, and can route data received from other nodes or devices to still other nodes or devices In another communication scheme, the network may be implemented in a tree structure, such that the network is organized into nodes forming a tree structure, with a root linked to branches, branches linked to other branches and to terminals, and finally terminals on the lowest level of hierarchy. Such a network structure is shown in FIG. 2. In this system, terminal nodes 7-25 only communicate to a respective branch node (e.g., 2-6) above a terminal node, and do not communicate directly to each other. For example, terminal nodes 11-14 only communicate with branch node 3 and do not communicate directly to each other. Similarly, branches nodes communicate to terminal nodes below them, and to branches nodes (e.g., branch node 1) above them, but not directly communicate to branches nodes on the same level of hierarchy. For example, branch node 4 communicates with branch node 1 but does not directly communicate with branch nodes 2, 3, 5, and 6. In this manner, a tree network is implemented.

Figure 3:
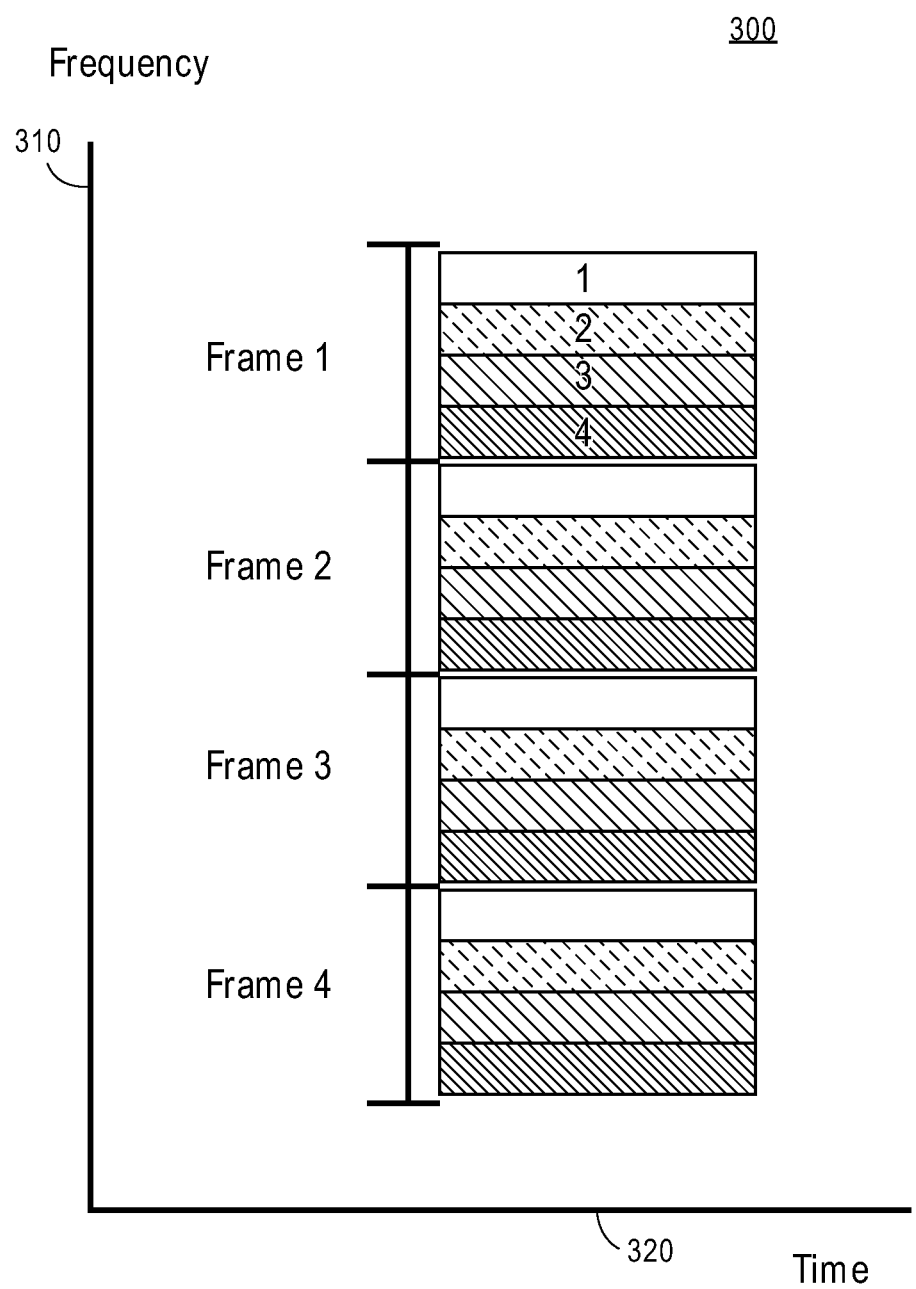
FIG. 3 shows the conceptual basis for frequency division multiplexing.

Since multiple wireless sensor networks in a typical wireless sensor network may be located within the same physical environment, there is a risk of collisions during wireless communication. A collision is defined as an event when two or more nodes attempt to communicate at the same time, resulting in at least a portion of the communication being unintelligible (e.g., garbled, distorted) to a processing circuit. Various strategies to avoid or mitigate collisions have been disclosed. In one means of avoiding collisions, frequency division multiplexing may be used as illustrated in the exemplary diagram 300 of FIG. 3. In this system, individual nodes may be assigned specific dedicated frequencies over which to communicate. By allocating different frequencies such that two nodes at risk of collision do not communicate at the same frequency, thus collisions can be avoided. In this exemplary diagram 300, the available frequency spectrum is divided into frames (e.g., frames 1-4) on a vertical frequency axis 310 and the frames are in turn divided into slots (e.g., slots 1-4). In the exemplar diagram, there are four frames and four slots available at any point in time on a horizontal time axis 320. By allocating slots between individual users (e.g., users 1-4), 4 separate users can transmit at the same time without collision.

Figure 4:
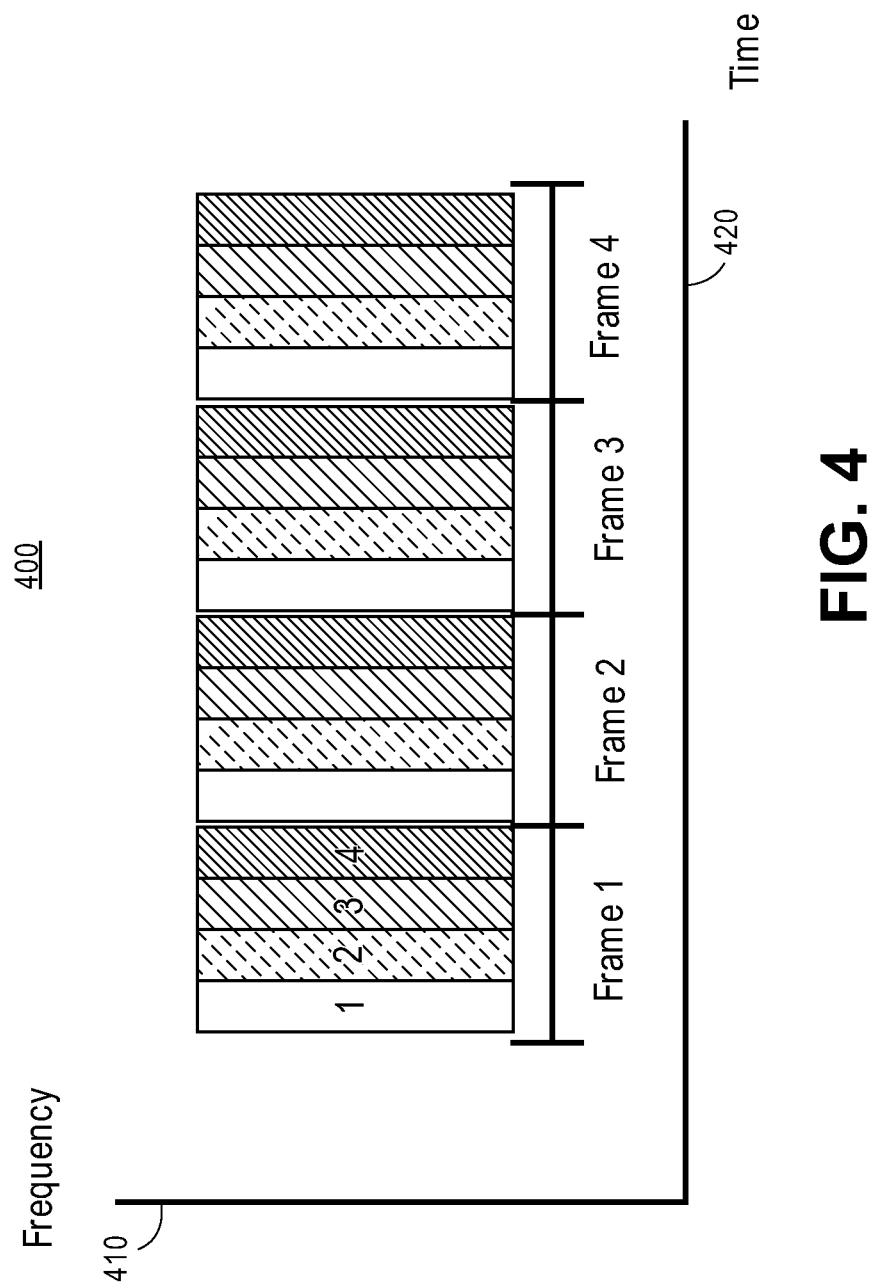
FIG. 4 shows the conceptual basis for time division multiplexing.

In another means of avoiding collisions, time division multiplexing may be used as illustrating in an exemplary diagram 400 of FIG. 4. In this system, individual nodes may be assigned specific time slices during which the nodes may communicate. By allocating time slices such that two nodes at risk of communication do not communicate during the same time slice, collisions can be avoided. The time slices (e.g., 1-4) of frames 1-4 as shown on a time axis 420 may be pre-defined, or may be established using a beacon or broadcast synchronization signal. In this diagram 400, multiple users (for example, multiple sensor nodes) may share the same frequency band of frequency axis 410 by using individually separate time slots. Since no two users transmit during the same time slot, collisions can be avoided.

Figure 5:
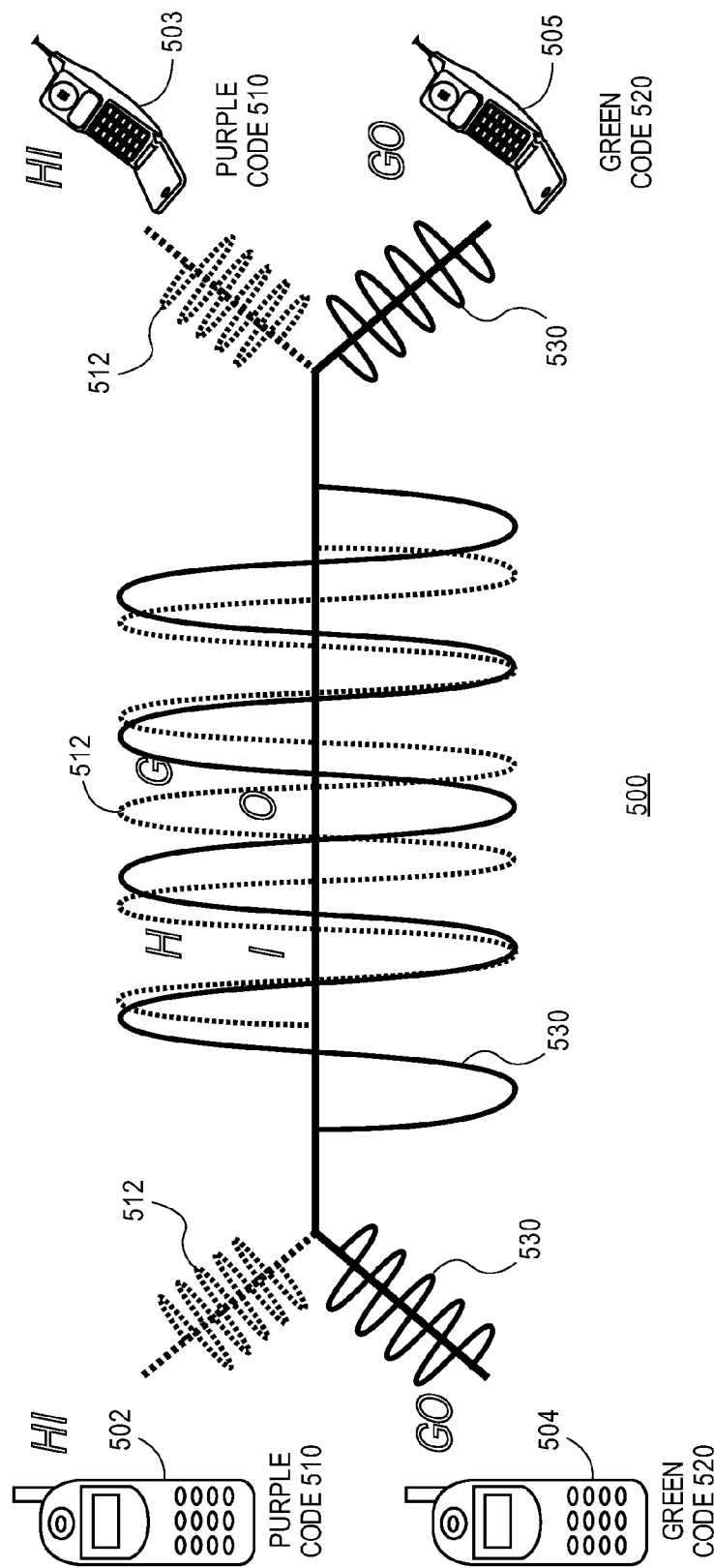
FIG. 5 shows the conceptual basis for code division multiplexing

In another means of avoiding collisions, code division multiplexing may be used. In this system, the available frequency spectrum for radio transmission is chosen to be wide enough that multiple nodes can communicate at the same carrier frequency using different spreading codes. This in turn allows for avoidance of collisions. This system is commonly used in cellular communication, for example, as shown in FIG. 5. In this system 500, the same general frequency spectrum is used by multiple users. However, individual users use different and separable spreading codes, such that they can be deconvoluted from each other despite sharing the same frequency and time space. For example, a user of a device 502 sends a communication 512 to a user of a device 503. The communication 512 is encoded and decoded with the purple code 510. At the same time, a user of a device 504 sends a communication 530 to a user of a device 505. The communication 530 is encoded and decoded with the green code 520.

In yet another means of avoiding collisions, spatial separation of sensor communications may be used, such that collisions are avoided by preventing colliding communications in the same physical space. This may be achieved by physically placing the sensors in different locations or by controlling the shape and extent of electromagnetic radiation associated with a particular communication event.

Electrical power for the operation of individual sensor nodes may be obtained in numerous ways. Power may be provided by connecting individual nodes to a battery. Power may also be provided by connecting individual nodes to electrical means, for example, by using a plug. Power may also be provided via energy harvesting, where energy is harvested by the node from available external energy sources. These energy sources could include vibration, solar power, electromagnetic radiation, heat, and other similar sources of harvestable energy. The harvestable energy may be incidental or may be deliberately made available to the node. The former may be the case, for example, in a wireless sensor network operating in a bright environment, such that solar power is incidentally available, while the latter may be the case in an environment where inductive power coupling is used to specifically transfer power to the sensor node from an external transmitter.

In many wireless sensor network applications, it is desirable to determine the location of the individual sensor nodes. In conventional wireless sensor networks, this has been achieved in various ways. In a first example, distance between sensor nodes is determined by using distancedependent communication effects to estimate distances between two sensor nodes communicating with each other. In a mesh network, by exploiting the various communication paths in the mesh, positioning of each node can be estimated based on the various estimated distances. In another example, location information is transmitted by each sensor node, thus specifying the location of the various nodes within the sensor network. The location may be determined using existing localization services such as the global positioning service (GPS).

The conventional approaches discussed herein suffer from certain deficiencies that affect their operation, efficiency, cost, and/or ability to be implemented in and around indoor environments such as would exist in homes, apartments, office and commercial buildings, and nearby exterior locations such as parking lots, walkways, and gardens. In particular, in such environments, there is a substantial asymmetry in available power, such that some locations will have access to plenty of power while others will be relatively power-starved. For example, locations close to electrical outlets will have access to power from the outlet, and locations in bright sunlight will have access to solar power, while locations away from the walls and in dark locations might be relatively power starved. In these applications, the previously described wireless sensor networks suffer from shortcomings that limit their operation, since these approaches do not exploit this asymmetry and are rather limited in their use of communication protocols, power availability, and overall operation. Furthermore, in indoor environments, localization strategies are altered. For example, GPS typically does not work well indoors due to poor satellite signal penetration. Similarly, the presence of multiple potential reflecting surfaces can complicate or prevent localization using iterative multi-point distance calculations.

In a typical wireless communication device, instantaneous power to transmit is usually significantly larger than instantaneous power required to receive. The power required in transmission is typically directly related to the desired range of communication, since the signal strength received at the target location must be sufficiently large as to enable discernment over the noise at that location. Range can thus be increased by increasing signal strength of the transmitted signal; this results in an increase in the power consumed during transmission. On the other hand, the power required to receive depends on the fraction of time during which the receive radio is operational for receiving transmitted signals (e.g., communications).

Mesh networks can reduce the power required during transmission by using multiple shorter hops rather than one long hop between nodes. On the other hand, in mesh networks, since the receive radio must be on most or all of the time to enable reception and/or relaying of signals from neighboring mesh nodes, the energy required to receive may be significantly larger than receive energy required to receive in network architectures in which the receive radio is only on sporadically. Therefore, systems in which only small amounts of data need to be transmitted, mesh networks can suffer from drawbacks with respect to energy consumption and thus with respect to battery life. Given the small amount of data required to be transmitted, such systems can be operated at low transmit duty cycles, such that the total transmit energy can be low despite a high transmit power requirement. In such systems, receive power becomes a greater concern therefore. As a consequence, mesh networks can have unfavorable power consumption requirements since the receive radios must be on for a substantial fraction of time to support the requisite mesh communications.

Even in mesh networks that eliminate repeater functionality in battery operated nodes, such drawbacks can still exist since the battery-operated nodes must still expend significant power to maintain transmit and receive compatibility with the mesh network architecture of the overall network.

Conventional tree networks suffer from drawbacks as well. In conventional tree networks working in indoor requirements, the power required to transmit can be high. In particular, since tree networks cannot exploit short-hop communications without having a high-density of hubs, tree networks can have significant node energy consumption associated with transmission due to the need to provide higher transmit powers to achieve robust communication over the long distances between nodes and hubs.

Conventional wireless sensor networks have drawbacks when used in systems requiring only small amounts of data transmission, such as might exist for collections of simple sensing functions. In such systems, the low amount of data required to be transmitted may result in poor utilization of the network capacity, resulting in a significant waste of energy in a network that does not duty cycle such that battery operated nodes are only in an operational mode for a small fraction of the time.

Conventional battery operated wireless sensor nodes can suffer from poor battery life since they can lose available battery energy due to self-discharge. This is a particular concern in systems running under low duty cycles of operation, since battery capacity is continuously lost due to self-discharge even when the node itself is in a low-energy sleep state.

Conventional wireless sensor networks have disadvantages in that they may be unable to localize individual sensor nodes or may require the use of multiple reception points to enable triangulation of sensor node locations or may require access to external localization systems or beacons such as GPS. Particularly in indoor environments, with significant risk of multi-path signal propagation, narrow-band sensor systems can suffer from poor or non-functional sensor localization ability due to signal degradation and temporal dispersion associated with multi-path events. Similarly, in indoor environments, availability of external localization systems or beacons such as GPS may be minimal or non-existing, preventing sensor localization. Even in networks utilizing ultra-wide-band communication, localization may be limited by the need to use multiple reception points to achieve triangulation of sensor position. This can result in increased overall network complexity and cost.

Conventional wireless sensor networks have additional disadvantages in that these wireless sensor networks may expend significant energy on collision avoidance during communication. Some conventional wireless sensor networks require implementation of frequency division multiplexing, which requires use of precisely tuned circuits. The operation of these circuits may expend significant energy due to power consumption associated with the tuned RF stages. On the other hand, conventional wireless sensor network systems implementing time division multiplexing may consume significant power due to the power consumption of the transmit and receive radios required to manage the time slice synchronization. In conventional systems implementing code division multiplexing, significant power may be expended in the circuitry implementing coding functions, due to the complexity of coding and decoding.

Wireless sensor networks including battery operated sensor nodes typically suffer from trade-offs between sensor communication range and battery life. Longer range of sensor network operation may be achieved by using higher power radio transmissions from the sensor nodes or by implementing a mesh network where individual nodes act as repeaters or routers to provide multi-hop communication over the physical range of the wireless sensor network. In the former example, sensor node power consumption is increased due to the higher expenditure on transmit power. In the latter example, both transmit and receive power may be increased. Transmit power is increased due to the increased network traffic involved in implementing the mesh network, while receive power is increased due to the need to have the receive radio on for large periods of time to monitor for incoming network traffic.

As a consequence of the energy costs associated with these communication activities, battery life on battery-operated sensor nodes is often limited. In indoor environments, it is to be noted that power for operation of sensor nodes and the wireless sensor network is plentiful in specific locations. In one embodiment, indoor environments include indoor and nearby exterior locations as would exist, for example, in homes, apartments, office and commercial buildings, and nearby exterior locations such as, for example, parking lots, walkways, and gardens. In one example, power is available at the specific locations of power outlets within a room environment or along exterior walls. Power is also available in areas of extensive sun exposure due to the ability to generate adequate solar power. Other examples of locally available power would be apparent to one of ordinary skill in the art. As a result, indoor environments offer a significant asymmetry in power availability, such that some nodes within a wireless sensor network deployed in such an environment would have plentiful access to external power sources, with other nodes in such an environment may be limited to the energy stored in an attached power source (e.g., battery).

In one embodiment, an asymmetry in power availability may be exploited to provide long range of communication in a wireless asymmetric network architecture while maintaining long battery life for nodes that are powered by a battery source. In an exemplary embodiment, a communication range of 20 meters between communicating nodes may be achieved while providing a long battery life (e.g., approximately 10 years, at least ten years) in battery operated nodes. This may be achieved by implementing an energy aware networking protocol in accordance with embodiments of this invention. Specifically, a tree-like network architecture may be used where long-life battery operated nodes are used on the terminal ends of the tree.

Figure 6:
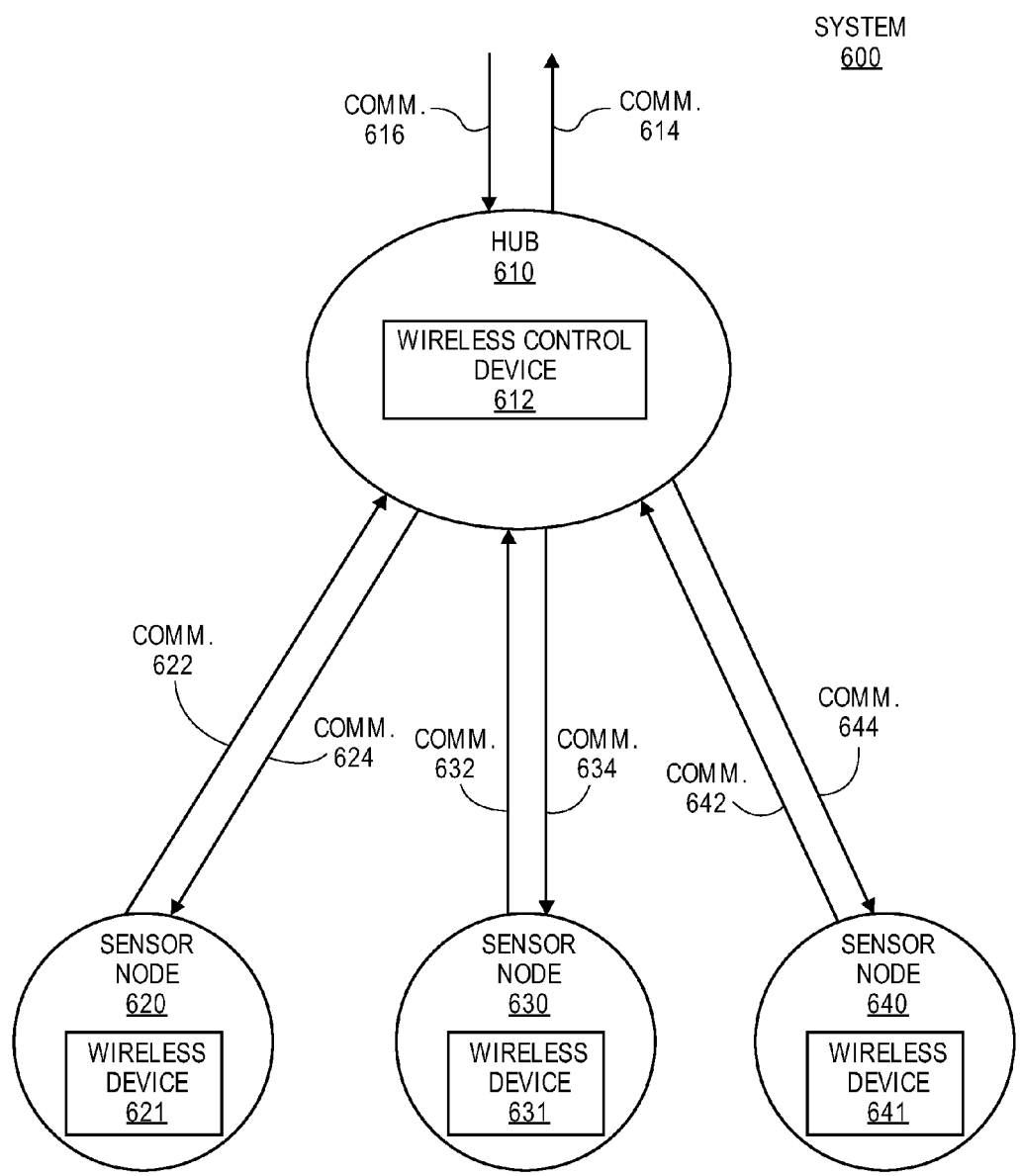
FIG. 6 is an asymmetric tree network architecture in accordance with one embodiment.

FIG. 6 shows a system with an asymmetric tree network architecture in accordance with one embodiment. The system 600 includes one hub 610 having a wireless control device 612 and three nodes 620, 630, and 640 that each include a wireless device 621, 631, and 641, respectively. Each wireless device includes RF circuitry (e.g., a transceiver with transmitter functionality and receiver functionality, a transmitter and a receiver) to enable bi-directional communications including communications 622, 624, 632, 634, 642, and 644 with the wireless control device of the hub 610 in the wireless asymmetric network architecture. For example, a sensor node 630 transmits a communication 632 (e.g., transmit communication of sensor node 630) and receives a communication 634 (e.g., receive communication of sensor node 630) from hub 610. From the perspective of the hub 610, the communication 632 is a receive communication and the communication 634 is a transmit communication for the hub. The wireless control device is configured to determine a scheduled timing of causing the transmitter to be operable to transmit and causing the receiver to be operable to receive for each wireless device to reduce power consumption of the wireless devices of the nodes 620, 630, and 640.

In one embodiment, the hub 610 is powered by a mains electrical source (e.g., alternating-current (AC) electric power supply) and the nodes are each powered by a battery source or another energy source (not mains electrical source) to form the wireless asymmetric network. The scheduled timing of powering the transmitter and powering the receiver for each wireless device of the nodes is determined based on a timing of communications between the hub and each wireless device of the nodes.

In one example, the transmitter for each wireless device of the nodes is operable for transmitting less than 5 percent of a time period and the receiver for each wireless device of the first plurality of nodes is operable for receiving less than 5 percent of the time period. In another example, the transmitter for each wireless device of the nodes is operable for transmitting less than 1 percent of a time period and the receiver for each wireless device of the nodes is operable for receiving less than 1 percent of the time period. The nodes are in a non-communicative state when the transmitter and the receiver of the wireless devices are not operable for transmitting and receiving, respectively.

The sensor nodes include one or more sensors including image sensors, moisture sensors, temperature sensors, humidity sensors, air quality sensors, light sensors, motion sensors, and audio sensors, etc. for different applications including home and office integrity and security. For example, the motion sensors may sense motion in order to determine whether a door or window has been unlocked and image sensors obtain images to determine whether an intruder has forced entry into a home or building. In this case, an alarm or warning signal can be sent to a device (e.g., source device, client device, mobile device, tablet device, computing device, etc.) of a home owner or owner of the building.

In another example, moisture sensors may determine whether a home or building has a potential leak or moisture issue. In some of these embodiments, it may sometimes be desirable for a sensor to communicate without waiting for its allotted time slot or transmit window. For example, such a situation may occur when an alarm sensor detects an intruder. In this instance, the sensor may transmit immediately, and the hub will receive the information since the hub has plenty of power and is always operable to receive. On the other hand, such a network will still benefit from the power reduction achieved by the hub-controlled transmit and receive windows during normal operation.

In certain embodiments, multiple hubs may communicate with each other, multiple nodes may communicate with multiple hubs, and hubs and nodes may be organized in more tiers so as to implement a multi-level tree network.

Figure 7:
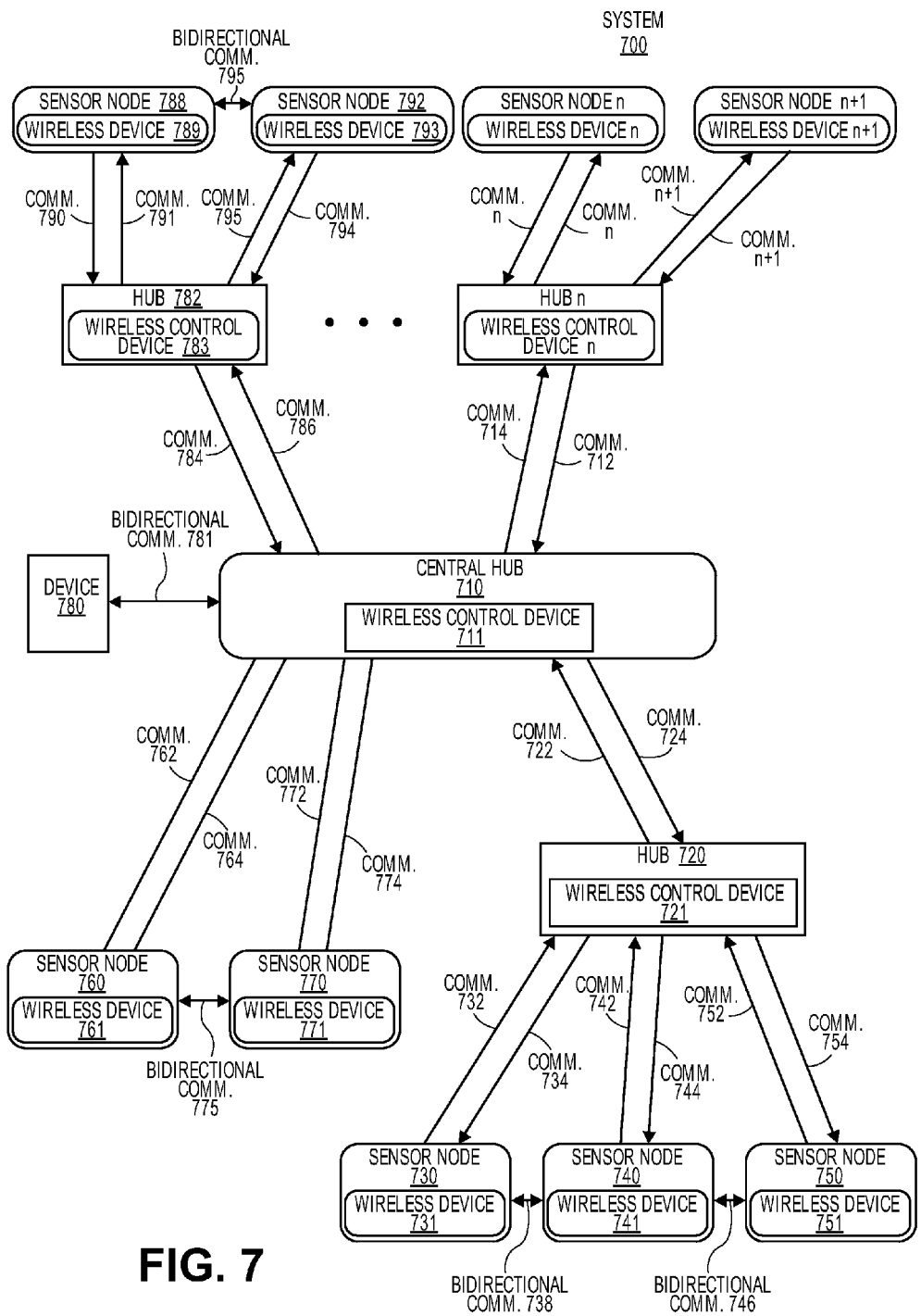
FIG. 7 shows a system with an asymmetric tree and mesh network architecture having multiple hubs in accordance with one embodiment.

FIG. 7 shows a system with an asymmetric tree and mesh network architecture having multiple hubs in accordance with one embodiment. The system 700 includes a central hub 710 having a wireless control device 712, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, n, and n+1, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

The wireless control device 721 is configured to determine a scheduled timing of causing the transmitter to be operable to transmit and causing the receiver to be operable to receive for each wireless device 731, 741, 750 to reduce power consumption of the wireless devices of the nodes 730, 740, and 750.

The wireless control device 711 of the central hub 710 is configured to determine a scheduled timing of causing the transmitter to be operable to transmit and causing the receiver to be operable to receive for each wireless device to reduce power consumption of the wireless devices of the nodes. For example, the wireless control device 711 of the central hub 710 is configured to determine a scheduled timing of causing the transmitter to be operable to transmit and causing the receiver to be operable to receive for each wireless device 761 and 771 to reduce power consumption of the wireless devices of the nodes 760 and 770.

In another example, the wireless control device 711 of the central hub 710 is also configured to determine a scheduled timing of causing the transmitter to be operable to transmit and causing the receiver to be operable to receive for each wireless control device of the hubs 720, 782, and n to reduce power consumption of these hubs particularly if these hubs are not powered by a mains electrical source.

In one embodiment, the central hub 710, hub 720, hub 782, and hub n are powered by a mains electrical source and the sensors nodes are each powered by a battery source or another energy source (not mains electrical source) to form the wireless asymmetric network. The scheduled timing of causing the transmitter to be operable to transmit and causing the receiver to be operable to receive for each wireless device of the nodes is determined based on a timing of communications between a hub and associated wireless device of the nodes.

By using the architectures illustrated in FIG. 6 or 7, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 98% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

In a deterministic manner related to the timing of the transmission, the nodes may also then operate so as to enable reception of data sent by the lowest-level hubs or other communicative devices within the tree network architecture or tree and mesh network architecture. Since the timing of the reception is related to the timing of the transmission, the terminal nodes do not expend excessive energy keeping their receive radios of the receivers of the RF circuitry active in a receive mode. Additionally, transmit radios of the RF circuitry in the lowest-level hubs, for example, are aware of when the receive radios of the terminal nodes are active based on the timing of the transmitted signals from the terminal nodes. Note that the lowest level hubs and other devices in the network architecture can maintain their receive radios in an operable mode for receiving communications (e.g., receive mode) for a substantial fraction of time since they are not energy constrained. The data sent by the hubs and received by the terminal nodes may include instructions, configuration information, node identification information, timing information, and other such information for the wireless sensor network.

The hubs may be physically implemented in numerous ways in accordance with embodiments of the invention. FIG. 8A shows an exemplary embodiment of a hub implemented as an overlay 800 for an electrical power outlet in accordance with one embodiment. The overlay 800 (e.g., faceplate) includes a hub 810 and a connection 812 (e.g., communication link, signal line, electrical connection, etc.) that couples the hub to the electrical outlet 802. Alternatively (or additionally), the hub is coupled to outlet 804. The overlay 800 covers or encloses the electrical outlets 802 and 804 for safety and aesthetic purposes.

FIG. 8B shows an exemplary embodiment of an exploded view of a block diagram of a hub 820 implemented as an overlay for an electrical power outlet in accordance with one embodiment. The hub 820 includes a power supply rectifier 830 that converts alternating current (AC), which periodically reverses direction, to direct current (DC) which flows in only one direction. The power supply rectifier 830 receives AC from the outlet 802 via connection 812 (e.g., communication link, signal line, electrical connection, etc.) and converts the AC into DC for supplying power to a controller circuit 840 via a connection 832 (e.g., communication link, signal line, electrical connection, etc.) and for supplying power to RF circuitry 850 via a connection 834 (e.g., communication link, signal line, electrical connection, etc.). The controller circuit 840 includes memory 842 or is coupled to memory that stores instructions which are executed by processing logic 844 (e.g., one or more processing units) of the controller circuit 840 for controlling operations of the hub for forming and monitoring the wireless asymmetrical network as discussed herein. The RF circuitry 850 may include a transceiver or separate transmitter 854 and receiver 856 functionality for sending and receiving bi-directional communications via antenna(s) 852 with the wireless sensor nodes. The RF circuitry 850 communicates bi-directionally with the controller circuit 840 via a connection 834 (e.g., communication link, signal line, electrical connection, etc.). The hub 820 can be a wireless control device 820 or the controller circuit 840, RF circuitry 850, and antenna(s) 852 in combination may form the wireless control device as discussed herein.

Figure 9B:
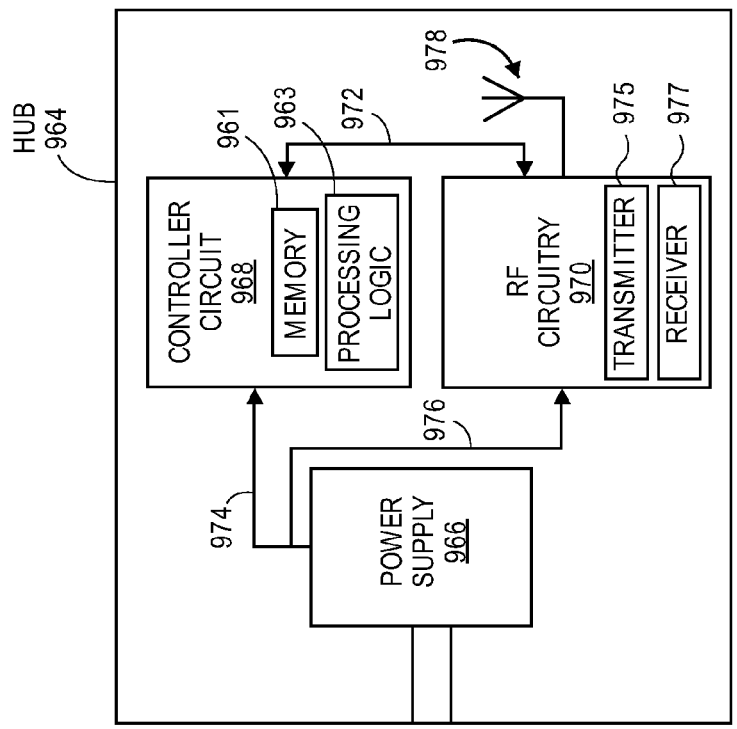
FIG. 9B shows an exemplary embodiment of a block diagram of a hub 964 implemented as a card for deployment in a computer system, appliance, or communication hub in accordance with one embodiment.
Figure 9A:
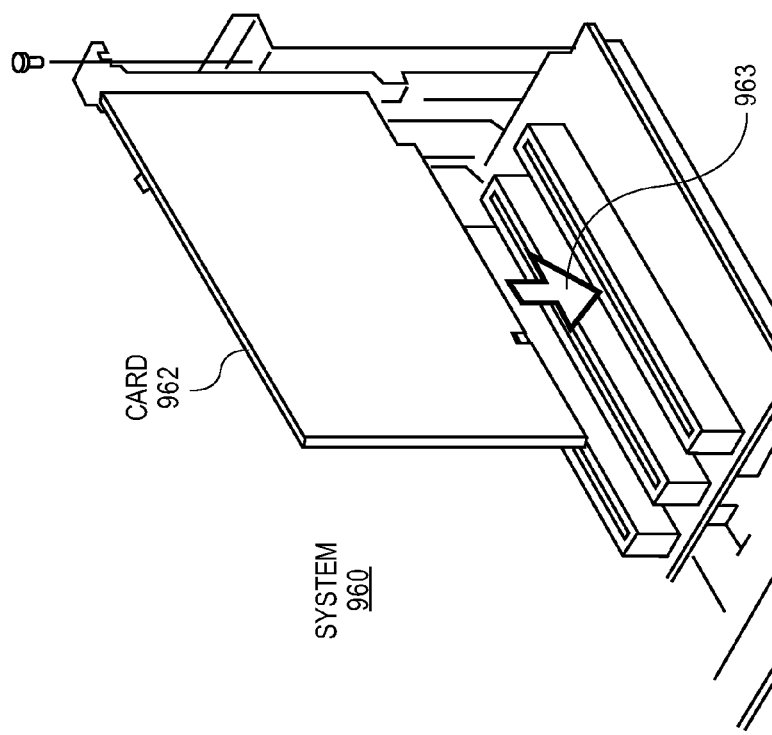
FIG. 9A shows an exemplary embodiment of a hub implemented as a card for deployment in a computer system, appliance, or communication hub in accordance with one embodiment.

FIG. 9A shows an exemplary embodiment of a hub implemented as a card for deployment in a computer system, appliance, or communication hub in accordance with one embodiment. The card 962 can be inserted into the system 960 (e.g., computer system, appliance, or communication hub) as indicated by arrow 963.

FIG. 9B shows an exemplary embodiment of a block diagram of a hub 964 implemented as a card for deployment in a computer system, appliance, or communication hub in accordance with one embodiment. The hub 964 includes a power supply 966 that provides power (e.g., DC power supply) to a controller circuit 968 via a connection 974 (e.g., communication link, signal line, electrical connection, etc.) and provides power to RF circuitry 970 via a connection 976 (e.g., communication link, signal line, electrical connection, etc.). The controller circuit 968 includes memory 961 or is coupled to memory that stores instructions which are executed by processing logic 963 (e.g., one or more processing units) of the controller circuit 968 for controlling operations of the hub for forming and monitoring the wireless asymmetrical network as discussed herein. The RF circuitry 970 may include a transceiver or separate transmitter 975 and receiver 977 functionality for sending and receiving bi-directional communications via antenna(s) 978 with the wireless sensor nodes. The RF circuitry 970 communicates bi-directionally with the controller circuit 968 via a connection 972 (e.g., communication link, signal line, electrical connection, etc.). The hub 964 can be a wireless control device 964 or the controller circuit 968, RF circuitry 970, and antenna(s) 978 in combination may form the wireless control device as discussed herein.

FIG. 9C shows an exemplary embodiment of a hub implemented within an appliance (e.g., smart washing machine, smart refrigerator, smart thermostat, other smart appliances, etc.) in accordance with one embodiment. The appliance 980 (e.g., smart washing machine) includes a hub 982.

FIG. 9D shows an exemplary embodiment of an exploded view of a block diagram of a hub 984 implemented within an appliance (e.g., smart washing machine, smart refrigerator, smart thermostat, other smart appliances, etc.) in accordance with one embodiment. The hub includes a power supply 986 that provides power (e.g., DC power supply) to a controller circuit 990 via a connection 996 (e.g., communication link, signal line, electrical connection, etc.) and provides power to RF circuitry 992 via a connection 998 (e.g., communication link, signal line, electrical connection, etc.). The controller circuit 990 includes memory 986 or is coupled to memory that stores instructions which are executed by processing logic 988 (e.g., one or more processing units) of the controller circuit 990 for controlling operations of the hub for forming and monitoring the wireless asymmetrical network as discussed herein. The RF circuitry 992 may include a transceiver or separate transmitter 994 and receiver 995 functionality for sending and receiving bi-directional communications via antenna(s) 999 with the wireless sensor nodes. The RF circuitry 992 communicates bi-directionally with the controller circuit 990 via a connection 994 (e.g., communication link, signal line, electrical connection, etc.). The hub 984 can be a wireless control device 984 or the controller circuit 990, RF circuitry 992, and antenna(s) 999 in combination may form the wireless control device as discussed herein.

Figure 10:
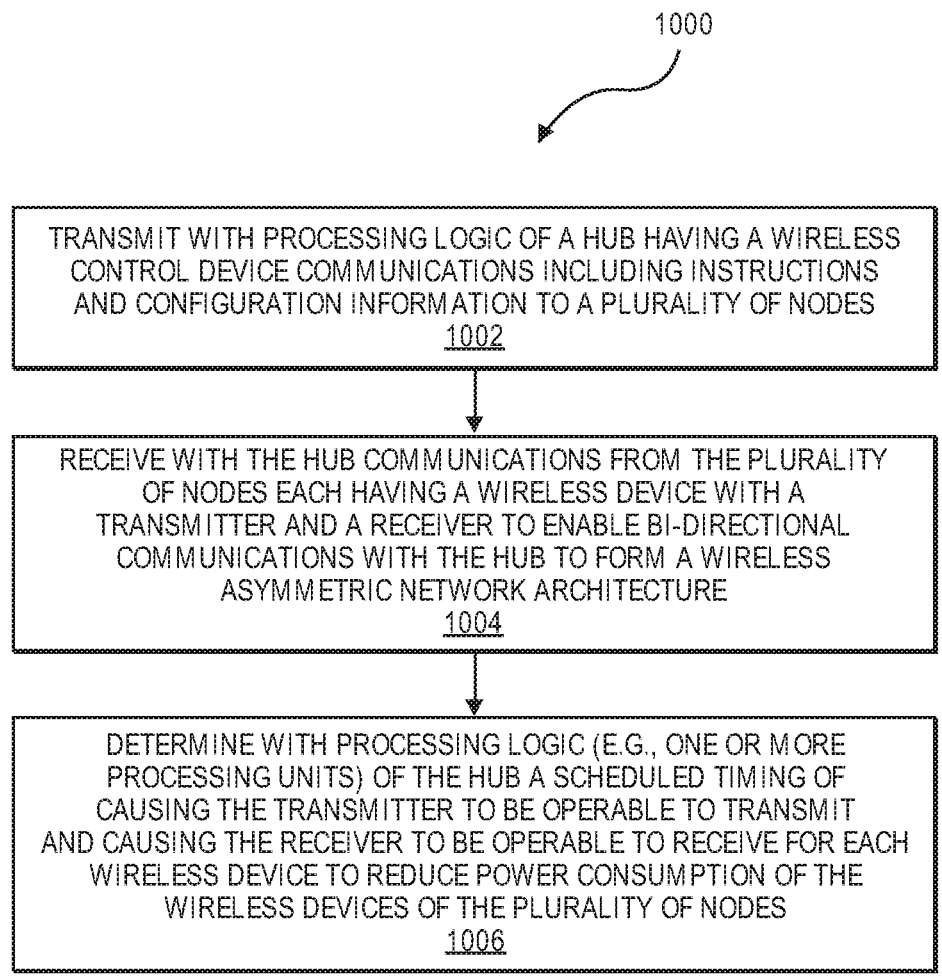
FIG. 10 illustrates a flow chart for a method of providing communications for a wireless asymmetric network architecture in accordance with one embodiment.

FIG. 10 illustrates a flow chart for a method of providing communications for a wireless asymmetric network architecture in accordance with one embodiment. The operations of method 1000 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1000.

At operation 1002, processing logic of a hub having a wireless control device transmits communications including instructions and configuration information to a plurality of nodes. Other information including node identification information, timing information, and other information may also be included in the transmitted communications. In one example, RF circuitry of the hub transmits and receives communications. At operation 1004, the hub receives communications from the plurality of nodes each having a wireless device with a transmitter and a receiver (or transceiver) to enable bi-directional communications with the hub to form a wireless asymmetric network architecture. At operation 1006, processing logic (e.g., one or more processing units) of the hub determines a scheduled timing of causing the transmitter (or transmitter functionality of a transceiver) to be operable to transmit and causing the receiver (or receiver functionality of a transceiver) to be operable to receive for each wireless device to reduce power consumption of the wireless devices of the plurality of nodes.

In one example, the hub is powered by a mains electrical source and the plurality of nodes are each powered by a battery source or another energy source to form the wireless asymmetric network architecture.

In one embodiment, the scheduled timing of causing the transmitter (or transmitter functionality of a transceiver) to be operable to transmit and causing the receiver (or receiver functionality of a transceiver) to be operable to receive for each wireless device is determined based on a timing of communications between the hub and each wireless device of the plurality of nodes. In one example, the scheduled timing of causing the receiver (or receiver functionality of a transceiver) to be operable to receive for at least one wireless device of the nodes is determined based on a timing of a communication being transmitted from the at least one wireless device to the hub.

In one example, the wireless asymmetric network architecture includes a wireless tree asymmetric network architecture. In another example, the wireless asymmetric network architecture includes a wireless tree and mesh asymmetric network architecture.

Figure 11:
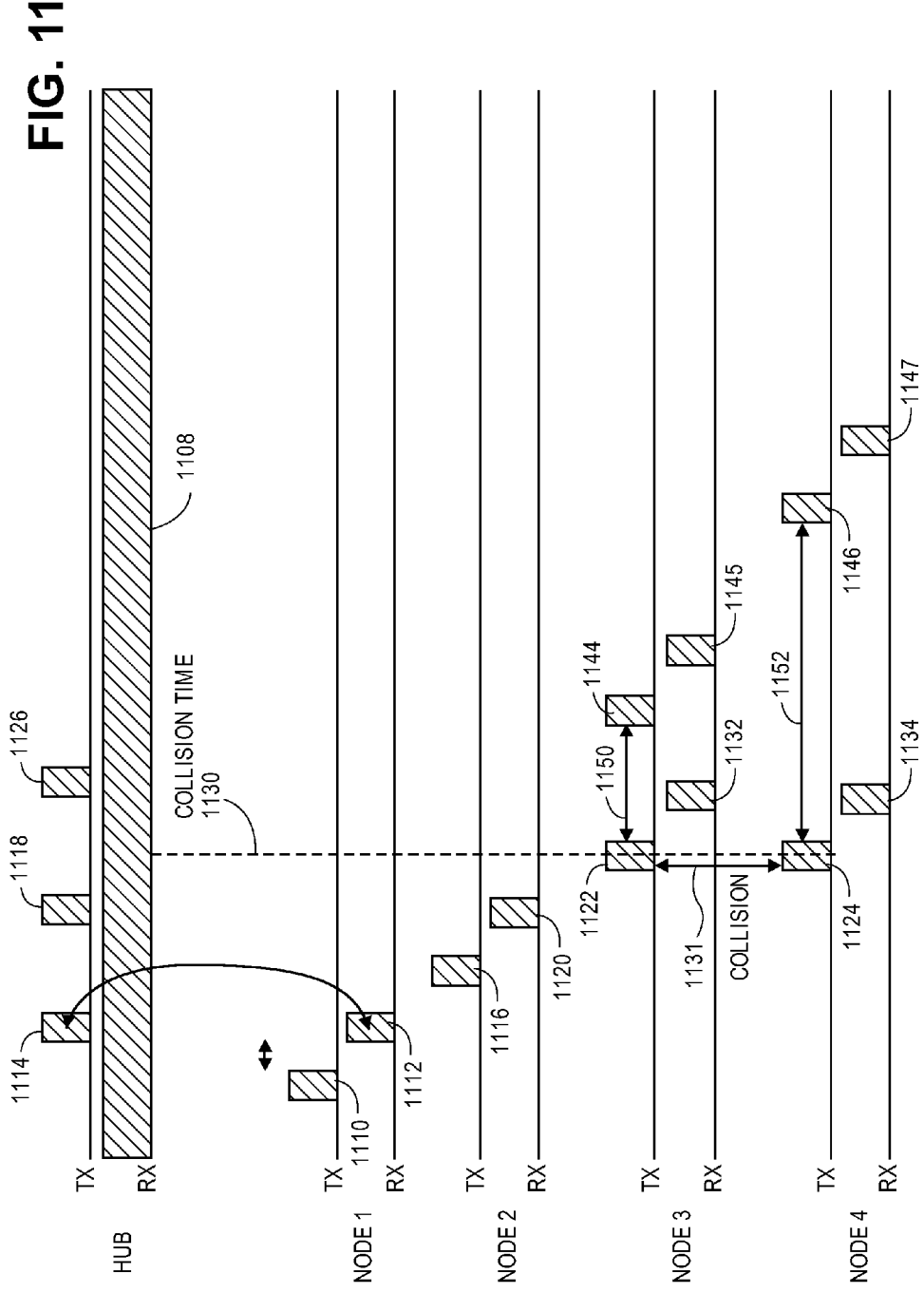
FIG. 11 illustrates a time sequence for shifting transmit and receive communications to avoid collisions in a wireless asymmetric network architecture in accordance with one embodiment.

In one embodiment, the hub may instruct one or more of the nodes to shift the timing of a future transmit/receive communications to avoid collisions on the network. FIG. 11 illustrates a time sequence for shifting transmit and receive communications to avoid collisions of a wireless asymmetric network architecture in accordance with one embodiment. FIG. 11 illustrates transmit and receive time lines for a hub and nodes 1-4 of the wireless asymmetric network architecture. Initially, node 1 transmits a communication to the hub during a transmit window 1110 of the transmit timeline (TX). In this embodiment, the hub listens continuously as illustrated by the continuous receive window 1108 of the hub. The hub then calculates a transmit window minus receive window separation of node 1 to determine a timing for a receive window 1112 of the receive timeline (RX) of node 1. The hub sends a communication to node 1 during transmit window 1114 of the hub and the receive window 1112 of node 1 receives this communication. In other words, a receiver of RF circuitry (or receiver functionality of a transceiver) of wireless device of node 1 is operable to receive during receive window 1112 in order to receive communications.

In a similar manner, the hub communicates or transacts with node 2. Node 2 transmits a communication to the hub during the transmit window 1116 of the transmit timeline (TX) of node 2. The hub then calculates a transmit window minus receive window separation of node 2 to determine a timing for a receive window 1120 of the receive timeline (RX) of node 2. The hub sends a communication to node 2 during a transmit window 1118 of the hub and the receive window 1120 of node 2 receives this communication.

The hub then detects a communication from node 3 during a transmit window 1122 of node 3 and at the same time or approximately the same time also detects a communication from node 4 during a transmit window 1124 of node 4. At this collision time 1130, the hub detects that a collision 1131 has occurred (e.g., when the hub detects that part or all of a transmission is unintelligible or irreversibly garbled). In other words, the communications from node 3 and node 4 combine to form an unintelligible transmission (e.g., an irreversibly garbled transmission) that is received by the hub at or near collision time 1130. The hub then can calculate the next receive window for any of the nodes that transmitted with the unintelligible or garbled transmission during the unintelligible or garbled transmit window (e.g., transmit windows 1122 and 1124). In that next receive window (e.g., receive windows 1132 and 1134) for nodes 3 and 4 or any further subsequent receive windows (e.g., receive windows 1145 and 1147), the hub with transmit window 1126 can instruct the colliding nodes (e.g., nodes 3 and 4) to shift their respective transmit and receive windows by different time delays or time periods as illustrated in FIG. 11. In this example, the time delay or shift 1150 from transmit window 1122 to transmit window 1144 of node 3 is less than the time delay or shift 1152 from transmit window 1124 to transmit window 1146 of node 4 in order to avoid a collision based on transmissions during transmit window 1144 and transmit window 1146.

This time delay or shift may be randomly determined using a random number generator in each node, for example, or may be determined and instructed by the hub. The hub may choose from available future windows and offer them as a set to the colliding nodes. These colliding nodes may then choose one of these randomly, for example. Once this selection is made, the collision should be avoided for future windows. On the other hand, if a collision occurs again in the next window (for example, because two of the colliding nodes happened to choose the same time shift), the process can be repeated until all collisions are avoided. In this way, the hub can arbitrate the operation of the entire network without requiring significant complexity from the nodes, thus reducing the energy required for operation of the nodes.

Figure 12:
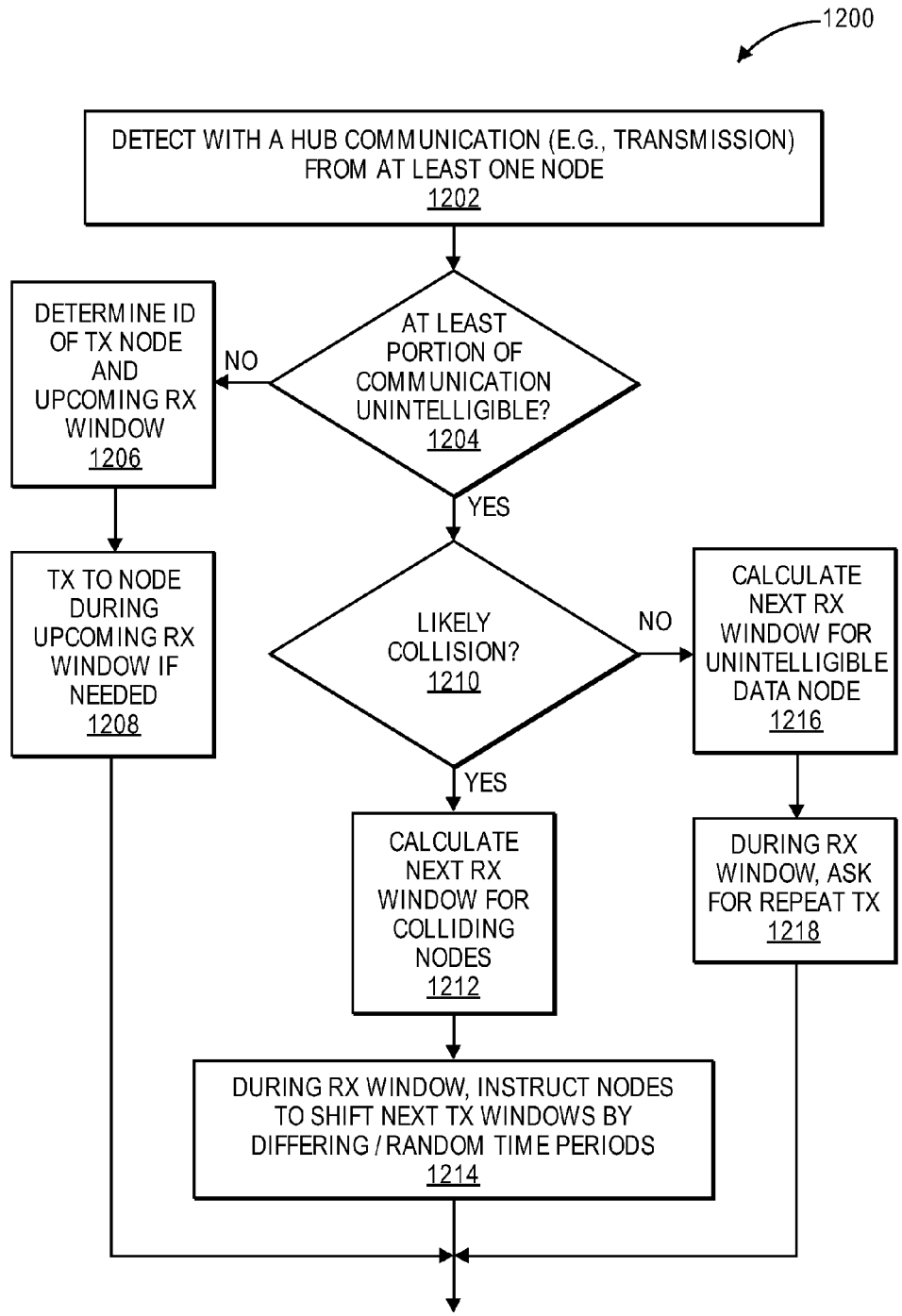
FIG. 12 illustrates a method of arbitration and collision avoidance for communications in a wireless asymmetric network architecture in accordance with one embodiment.

FIG. 12 illustrates a method of arbitration and collision avoidance for communications in a wireless asymmetric network architecture in accordance with one embodiment. The operations of method 1200 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1200.

At operation 1202, a receiver (e.g., RF circuitry, receiver functionality of a transceiver) of the hub detects a communication (e.g., transmission) from at least one node of a plurality of nodes within the wireless asymmetric network architecture. Each node includes or is a wireless device with a transmitter and a receiver (or transmitter and receiver functionality of a transceiver) to enable bi-directional communications with the hub to form the wireless asymmetric network architecture. At operation 1204, processing logic of the hub determines whether at least a portion (e.g., 25%, 50%, 75%) of the communication is unintelligible (e.g., garbled, distorted) to processing circuitry of the hub or processing circuitry connected to the hub potentially based on interference from another communication or RF source.

At operation 1206, when the communication is determined to be intelligible, the processing logic of the hub determines an identification of the node that transmitted the communication and also determines a next or subsequent receive window(s) for the transmitting node. At operation 1208, a transmitter (or transmitter functionality of a transceiver) of the hub transmits a communication to this node during the determined next or subsequent receive window(s) if necessary or appropriate.

At operation 1210, when at least a portion of the communication is determined to be unintelligible, the processing logic of the hub determines whether a collision of communications transmitted at approximately the same time from different nodes has likely occurred (e.g., approximately equal to or greater than 50 percent chance of collision occurring). If so, then the processing logic of the hub calculates a next or subsequent receive windows for the colliding nodes at operation 1212. During receive windows of the colliding nodes, the hub (e.g., transmitter of the hub, transmitter functionality of a transceiver of the hub) transmits communications to the colliding nodes with instructions for the nodes to shift a next transmit window by differing time periods or randomly determined time periods. For example, a first node is instructed based on a first communication from the hub to shift a next transmit window by a first time period while a second node is instructed by a second communication from the hub to shift a next transmit window by a second time period. In this example, the first and second periods are sufficiently different to avoid collisions from future transmissions of the first and second nodes.

If the processing logic of the hub determines at operation 1210 that a collision of communications transmitted at approximately the same time from different nodes has likely not occurred, then at operation 1216 the processing logic of the hub determines a next or subsequent receive window for the node that transmitted a communication with at least a portion of the communication being unintelligible to processing circuitry of the hub or processing circuity coupled to the hub. At operation 1218, during the calculated next or subsequent receive window of the node, the processing logic of the hub sends a communication from the hub to the node with the communication requesting a repeat transmission of the earlier communication from the node.

In one embodiment, an apparatus (e.g., hub, wireless control device, etc.) for providing a wireless asymmetric network architecture includes a memory (e.g., memory 842, memory 961, memory 986, memory 1886) for storing instructions, processing logic (e.g., one or more processing units, processing logic 844, processing logic 963, processing logic 988, processing logic 1888) to execute instructions to establish and control communications in the wireless asymmetric network architecture, and radio frequency (RF) circuitry to transmit and receive communications in the wireless asymmetric network architecture. The RF circuitry (e.g., RF circuitry 850, RF circuitry 970, RF circuity 992, RF circuitry 1890) to transmit communications to a plurality of nodes each having a wireless device with a transmitter and a receiver (or transmitter and receiver functionality of a transceiver) to enable bi-directional communications with the RF circuitry of the hub in the wireless asymmetric network architecture. The processing logic (e.g., one or more processing units) are configured to execute instructions to determine a transmit window for a transmitter and a receive window for a receiver of each wireless device (e.g., sensor nodes, terminal nodes) that transmit a communication to the apparatus and provide anti-collision features to avoid collisions of the communications received from the wireless devices.

In one example, the apparatus is powered by a mains electrical source and the plurality of nodes are each powered by a battery source or another energy source (not mains electrical source) to form the wireless asymmetric network.

In one embodiment, the processing logic (e.g., one or more processing units) of the hub are configured to execute instructions to determine whether a collision has occurred for a communication received from a first node and calculate next or subsequent receive windows for the first node and a second node if a collision of communications from the first and second nodes has occurred.

In one example, the processing logic (e.g., one or more processing units) of the hub are configured to execute instructions to transmit a communication to each of the first and second nodes with each communication for each node to cause a shift of a next transmit window for each node by differing time periods or randomly determined time periods during receive windows of the first and second nodes.

The processing logic (e.g., one or more processing units) of the hub are configured to execute instructions to generate at least one random number and to shift at least one of a future transmit window or a future receive window for at least one node based on the at least one random number when the collision has occurred for communications received from the first and second nodes. In one example, the wireless asymmetric network architecture is implemented within a building or near the building in order to secure and monitor conditions within or near the building.

In one embodiment, additional communication may be provided between the hubs at the various upper levels of the tree network architecture or tree and mesh network architecture. This communication may include transfer of data received form the terminal nodes or data to be sent to the terminal nodes, configuration information, timing information, hub and/or node identification information, and other such.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways. In one embodiment, the communication may be achieved using ultra-wide-band communication (UWB). UWB has several advantages. For example, UWB communication offers better immunity to problems associated with multi-path interference. In narrow-band systems, it is well-known that time-delayed signals reflecting off surfaces added to line-of-sight signals, for example, can cause degradation of signal strength and integrity. In UWB, on the other hand, since pulse widths are short, degradation is generally suppressed. UWB also offers better channel utilization, which is helpful in a wireless sensor network with multiple simultaneously communicating nodes. UWB also offers better penetration properties, such that walls, etc. present in indoor environments do not degrade network performance as significantly as they do for many narrow-band networks. UWB also allows for a much simpler radio architecture, with less RF components such as inductors, capacitors, etc. This is advantageous in low-power environments since powering of these components typically increases overall power consumption. Thus, UWB has advantages in terms of improved battery life for battery operated UWB radios in terminal nodes.

Figure 13:
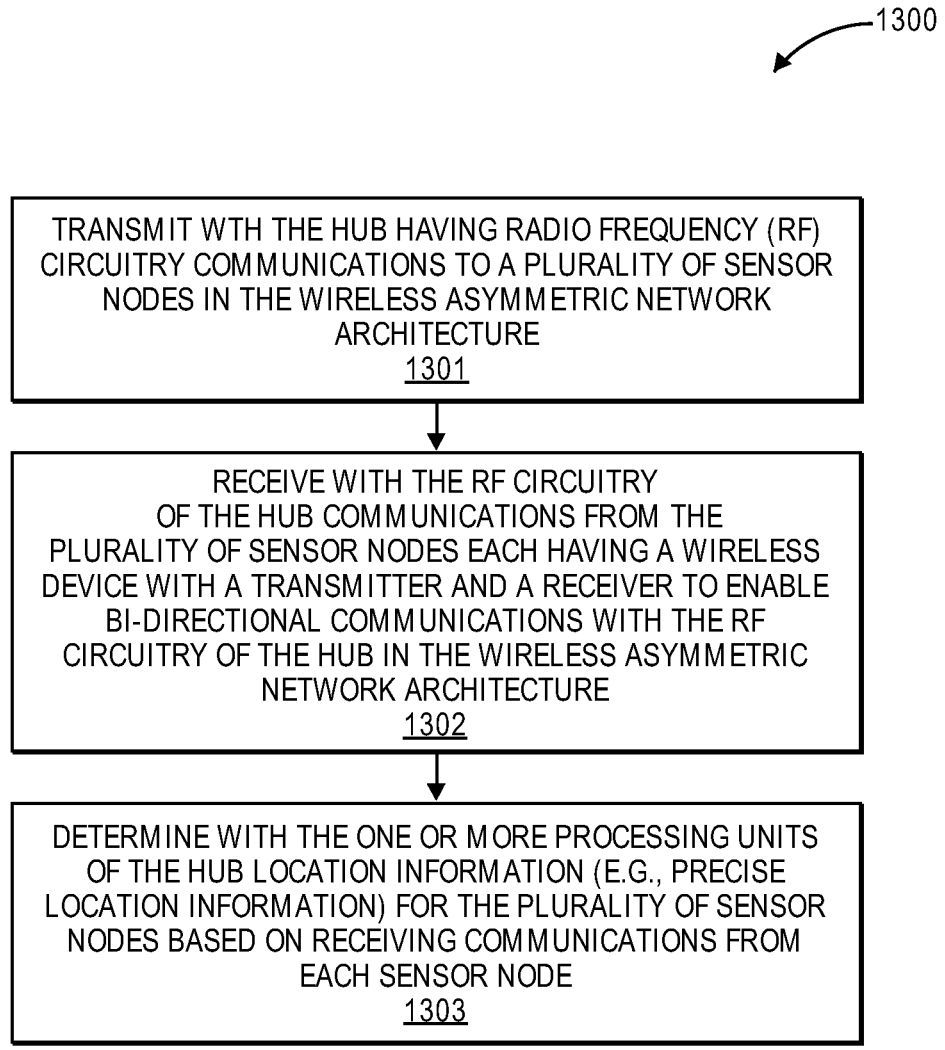
FIG. 13 illustrates a flow chart for a method of providing implementation of sensor localization for a wireless asymmetric network architecture in accordance with one embodiment.

Furthermore, UWB allows implementation of sensor localization in a relatively straightforward manner. FIG. 13 illustrates a flow chart for a method of providing implementation of sensor localization for a wireless asymmetric network architecture in accordance with one embodiment. The operations of method 1300 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1300.

At operation 1301, the hub having radio frequency (RF) circuitry and at least one antenna transmits communications to a plurality of sensor nodes in the wireless asymmetric network architecture. At operation 1302, the RF circuitry and at least one antenna of the hub receives communications from the plurality of sensor nodes each having a wireless device with a transmitter and a receiver to enable bi-directional communications with the RF circuitry of the hub in the wireless asymmetric network architecture. At operation 1303, the processing logic (e.g., one or more processing units) of the hub determine location information (e.g., precise location information) for the plurality of sensor nodes based on receiving communications from each sensor node. The level of precision required may be chosen based on the needs of the application for which the sensor network is deployed. For example, location precision may be better than 1 meter (m) in any direction, such that in a typical indoor or near-indoor environment, the approximate position of the sensors are known, and there is little or no overlap in the certainly of position of any two or more sensors. In applications requiring greater precision, location precision of better than 10 centimeters (cm) can be obtained, such that the accurate position of each sensor node is known.

In one example, the hub is powered by a mains electrical source and the plurality of sensor nodes are each powered by a battery source or another energy source (not mains electrical source) to form the wireless asymmetric network architecture.

In one example, the one or more processing units of the hub determine location information for the plurality of sensor nodes based on at least one of angle of arrival information, signal strength information, and time of arrival information for the communications received from the plurality of sensor nodes.

In another example, the one or more processing units determine location information for the plurality of sensor nodes based on angle of arrival information for determining an angle of arrival with a strongest signaling component and combined with information to identify a shortest direct path in a multi-path environment, which is determined from time of arrival information, for the communications from the plurality of sensor nodes.

In one example, the wireless asymmetric network architecture includes at least one of a wireless tree asymmetric network architecture or a wireless tree and mesh asymmetric network architecture.

In one embodiment, the at least one antenna of the hub transmits ultra-wide band (UWB) communications to the plurality of sensor nodes and to receive UWB communications from the plurality of sensor nodes.

Hubs receiving UWB transmissions from nodes, for example, can determine the location of nodes using angle of arrival (AOA), signal strength (SS) and/or Time of Arrival (TOA) information. AOA information can be determined using multiple antennas on the hub to enable determination of the angle of arrival with the strongest signal component. Combined with information to identify the most direct path, which can be determined from TOA, sensor location can be established. Due to the short pulses used in UWB, accuracy of TOA can be high, particularly in environments with multiple paths. Similarly, SS information can be used to estimate sensor distance from nodes, and, combined with AOA, can provide sensor localization. In one example, the overall architecture for UWB-based sensor localization is shown in FIG. 14.

Figure 14:
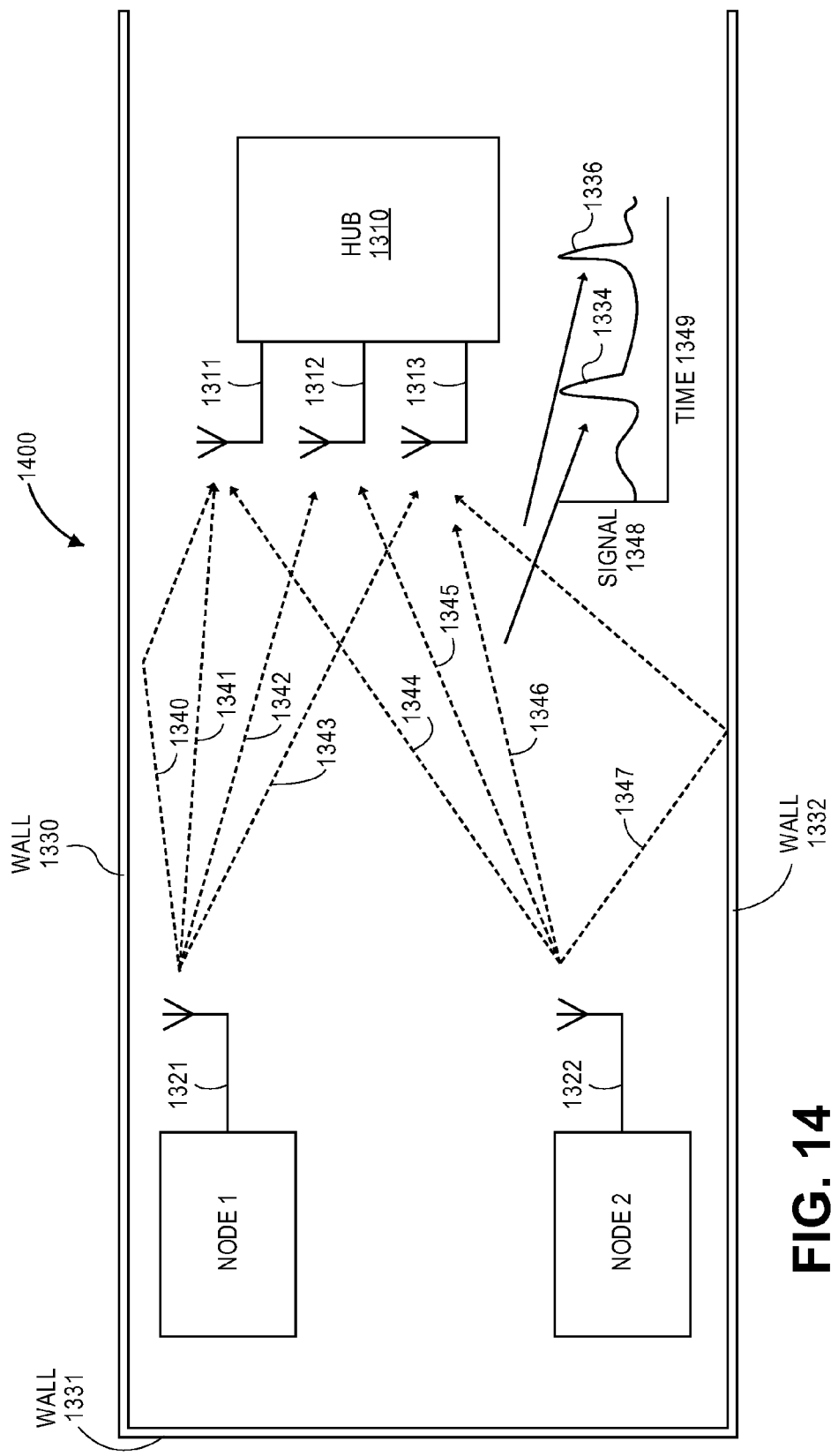
FIG. 14 illustrates use of multiple antennas on an apparatus (e.g., hub) and a multipath environment to enable sensor localization in accordance with one embodiment.

FIG. 14 illustrates use of multiple antennas on an apparatus (e.g., hub) and a multipath environment to enable sensor localization in accordance with one embodiment. The environment 1400 includes walls 1330, 1331, and 1332. A hub 1310 includes antennas 1311, 1312, and 1313. The sensor node 1 includes an antenna 1321 and the sensor node 2 includes an antenna 1322. The hub 1310 if receiving transmissions 1340-1347 (e.g., UWB transmissions) from nodes 1 and 2, for example, can determine the location of nodes 1 and 2 using angle of arrival (AOA), signal strength (SS) and/or Time of Arrival (TOA) information. The effect of multiple paths (e.g., based on reflections from walls or other objects such as a first path for transmission 1346 and a second path for transmission 1347 that is reflected by wall 1332) can be accommodated due to short UWB pulses as illustrated by the 2 peaks of the signal 1348 versus time 1349. The signal 1348 represents a combination of transmissions 1346 and 1347. A first peak 1334 represents the transmission 1346 while a second peak 1336 represents the transmission 1347. AOA information can be determined using multiple antennas 1311-1313 on the hub 1310 to enable determination of the angle of arrival with the strongest signal component. Combined with information to identify the most direct path, which can be determined from TOA, sensor location of nodes 1 and 2 can be established. Due to the short pulses used in UWB, accuracy of TOA can be high, particularly in environments with multiple paths. Similarly, SS information can be used to estimate sensor distance from nodes, and, combined with AOA, can provide sensor localization.

In one embodiment, an apparatus (e.g., hub 610, hub 710, hub 720, hub 782, hub n, hub 820, hub 964, hub 984, hub 1310, hub 1882) for providing a wireless asymmetric network architecture includes a memory (e.g., memory 842, memory 961, memory 986, memory 1886) for storing instructions, processing logic (e.g., one or more processing units, processing logic 844, processing logic 963, processing logic 988, processing logic 1888) of the hub to execute instructions to establish and control communications in a wireless asymmetric network architecture, and radio frequency (RF) circuitry (e.g., RF circuitry 850, RF circuitry 970, RF circuity 992, RF circuitry 1890) including multiple antennas (e.g., antenna(s) 852, antenna(s) 978, antenna(s) 999, antennas 1311, 1312, and 1313) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture. The processing logic (e.g., one or more processing units) are configured to execute instructions to determine location information for the plurality of sensor nodes based on receiving communications from each sensor node.

In one embodiment, the apparatus is powered by a mains electrical source and the plurality of sensor nodes are each powered by a battery source or another energy source (not mains electrical source) to form the wireless asymmetric network.

In one embodiment, the processing logic (e.g., one or more processing units) are configured to execute instructions to determine location information for the plurality of sensor nodes based on at least one of angle of arrival information, signal strength information, and time of arrival information for the communications from the plurality of sensor nodes.

In one embodiment, the processing logic (e.g., one or more processing units) are configured to execute instructions to determine location information for the plurality of sensor nodes based on angle of arrival information for determining an angle of arrival with a strongest signaling component and combined with information to identify a shortest direct path in a multi-path environment, which is determined from time of arrival information, for the communications from the plurality of sensor nodes.

In one example, the wireless asymmetric network architecture includes at least one of a wireless tree asymmetric network architecture or a wireless tree and mesh asymmetric network architecture.

In one embodiment, the multiple antennas of the RF circuitry to transmit ultra-wide band (UWB) communications to the plurality of sensor nodes and to receive UWB communications from the plurality of sensor nodes.

In an alternative embodiment, multiple hubs can be used to simultaneously receive data from sensor nodes. In this application, by triangulating from distances measured via SS or TOA estimates, location of sensors can be established without need for AOA determination. This example is shown in FIG. 15.

Figure 15:
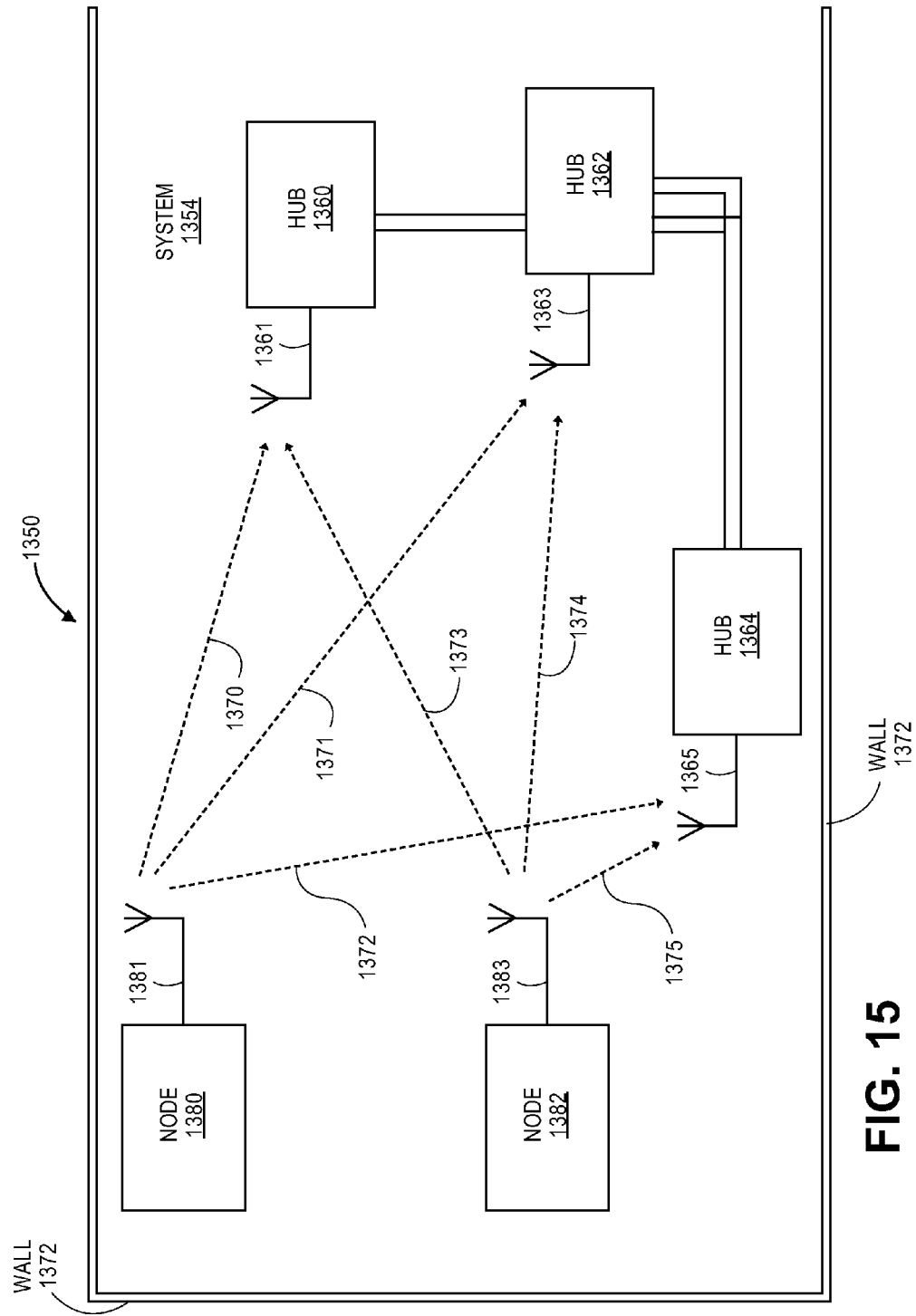
FIG. 15 illustrates use of multiple hubs each having a single antenna to achieve localization in accordance with one embodiment.

FIG. 15 illustrates use of multiple hubs each having a single antenna to achieve localization of sensors in accordance with one embodiment. The environment 1350 includes walls 1370, 1371, and 1372. A system 1354 includes a hub 1360 having an antenna 1361, a hub 1362 having an antenna 1363, and a hub 1364 having an antenna 1365. The hubs are synchronized with each other. The sensor node 1382 includes an antenna 1383 and the sensor node 1380 includes an antenna 1381. The sensor node 1380 transmits transmissions 1370-1372 to the hubs 1360, 1362, and 1364, respectively as illustrated in FIG. 15. The sensor node 1382 transmits transmissions 1373-1375 to the hubs 1360, 1362, and 1364, respectively as illustrated in FIG. 15. Time of arrival information at multiple hubs can be used to map location of the nodes 1380 and 1382.

In one embodiment, a system (e.g., system 1350) for providing a wireless asymmetric network includes a first hub (e.g., hub 1360) having processing logic (e.g., one or more processing units) and a first antenna (e.g., antenna 1361) for transmitting and receiving communications in the wireless asymmetric network. A second hub (e.g., hub 1362) includes processing logic (e.g., one or more processing units) and a second antenna (e.g., antenna 1361) for transmitting and receiving communications in the wireless asymmetric network. The system also includes a plurality of sensor nodes (e.g., nodes 1380 and 1382) each having a wireless device with a transmitter and a receiver (or transmitter and receiver functionality of a transceiver) to enable bi-directional communications with the first and second hubs in the wireless asymmetric network architecture. The processing logic (e.g., processing logic of controller circuit 840, 968, 990) of at least one of the first and second hubs are configured to execute instructions to determine location information for the plurality of sensor nodes based on receiving communications from each sensor node.

In one example, the first hub is powered by a mains electrical source and the plurality of sensor nodes are each powered by a battery source to form the wireless asymmetric network.

In one embodiment, the first and second hubs are synchronized with each other and share location information of the plurality of sensors nodes.

In one embodiment, the processing logic (e.g., one or more processing units) of the first and second hubs are configured to execute instructions to determine location information for the plurality of sensor nodes based on triangulating from distances measured via time of arrival information that is associated with the received communications.

In another embodiment, the processing logic (e.g., one or more processing units) of the first and second hubs are configured to execute instructions to determine location information for the plurality of sensor nodes based on triangulating from distances measured via strength of signal information that is associated with the received communications.

In one example, the wireless asymmetric network architecture includes a wireless tree asymmetric network architecture. In another example, the wireless asymmetric network architecture includes a wireless tree and mesh asymmetric network architecture.

In one embodiment, the processing logic (e.g., one or more processing units) of the second hub are configured to execute instructions to send communications to the first hub and to receive communications from the first hub for controlling and monitoring the wireless asymmetric network architecture.

In one embodiment, the first antenna of the first hub and the second antenna of the second hub transmit ultra-wide band (UWB) communications to the plurality of sensor nodes and to receive UWB communications from the plurality of sensor nodes.

In one embodiment, a system for providing a wireless asymmetric network architecture includes power management features for reducing power consumption of sensor nodes. The system (e.g., system 700) includes a first hub (e.g., hub 710, hub 820, hub 964, hub 984, hub 1882, etc.) having a wireless control device that is configured to control communications and power consumption in the wireless asymmetric network architecture and a first plurality of sensor nodes (e.g., sensor nodes 731, 741, 751; sensor nodes 761, 771; sensor nodes 788, 792; sensor nodes n, n+1; etc.) each having at least one sensor and a wireless device with a transmitter and a receiver (or transmitter and receiver functionality of a transceiver) to enable bi-directional communications with the wireless control device of the first hub in the wireless asymmetric network architecture. The wireless control device of the first hub is configured to determine a scheduled timing of operating each sensor node during a first time period that is close in time with respect to a transmit window of the transmitter (or transmitter functionality of a transceiver) and during a second time period that is close in time with respect to a receive window of the receiver (or receiver functionality of a transceiver) for each wireless device to reduce power consumption of the wireless devices of the first plurality of sensor nodes.

In one example, the first hub is powered by a mains electrical source and the first plurality of sensor nodes are each powered by a battery source or another energy source (not mains electrical source) to form the wireless asymmetric network architecture.

In one embodiment, the wireless control device is configured to determine a scheduled timing of the transmit window of the transmitter (or transmitter functionality of a transceiver) and the receive window of the receiver (or receiver functionality of a transceiver) for each wireless device based on a timing of receiving a communication from each wireless device of the plurality of sensor nodes.

In one embodiment, each sensor node operates at a first power consumption level for the first and second time periods. For example, each sensor node can operate at a second power consumption level when outside of the first and second time periods. The first power consumption level has more power consumption than the second power consumption level in this example.

In a more specific embodiment, each sensor node operates at a first clock speed for the first and second time periods. Each sensor node operates at a second clock speed when outside of the first and second time periods. The second clock speed can be a reduced clock speed to reduce power consumption of each sensor node in comparison to the first clock speed.

In one embodiment, at least one sensor node operates with a battery source that includes a rechargeable battery designed for recharging. The at least one sensor node may also include a capacitor or is coupled to a capacitor to store energy from energy harvesting that is used to avoid deep discharge of the battery source by recharging the rechargeable battery.

In another embodiment, at least one sensor node operates with a battery source that includes a primary cell that is not intended for recharging. The at least one sensor node includes a capacitor or is coupled to a capacitor to store energy from energy harvesting to trickle charge the primary cell thus increasing effective battery capacity by compensating for energy drawn from the battery source during operation, or lost due to self-discharge of the battery source.

In one embodiment, a second hub (e.g., hub 720, hub 782, hub n, hub 820, hub 964, hub 984, hub 1882, etc.) includes a wireless control device that is configured to control communications and power consumption in the wireless asymmetric network architecture and a second plurality of sensor nodes (e.g., sensor nodes 731, 741, 751; sensor nodes 761, 771; sensor nodes 788, 792; sensor nodes n, n+1; etc.) each having at least one sensor and a wireless device with a transmitter and a receiver (or transmitter and receiver functionality of a transceiver) to enable bi-directional communications with the wireless control device of the second hub in the wireless asymmetric network architecture. In one example, the wireless control device is configured to determine a scheduled timing of operating each sensor node during a third time period that is close in time with respect to a transmit window of the transmitter (or transmitter functionality of a transceiver) and during a fourth time period that is close in time with respect to a receive window of the receiver (or receiver functionality of a transceiver) for each wireless device to reduce power consumption of the wireless devices of the second plurality of sensor nodes.

In one example, the third time period is approximately the same time period as the transmit window and the fourth time period is approximately the same time period as the receive window. In another example, the third time period starts just prior to a time period of the transmit window and completes just after the transmit window. The third time period may be 1-10% longer than the time period of the transmit window. The fourth time period starts just prior to a time period of the receive window and completes just after the receive window. The fourth time period may be 1-10% longer than the time period of the receive window.

In one embodiment, the wireless asymmetric network architecture includes a wireless tree asymmetric network architecture. In another embodiment, the wireless asymmetric network architecture includes a wireless tree and mesh asymmetric network architecture.

In one embodiment for reduced power consumption based on use of a higher frequency band, the wireless control device of the first hub includes radio frequency (RF) circuitry that operates at a frequency band greater than 2.4 GigaHertz (GHz). The transmitter and the receiver (or transmitter and receiver functionality of a transceiver) of each wireless device of the first plurality of nodes also operates at a frequency band greater than 2.4 GHz in order to minimize a third time period for causing RF circuitry of the transmitter to be operable and a fourth time period for causing RF circuitry of the receiver to be operable for each wireless device to reduce power consumption of the wireless devices of the first plurality of nodes.

In another embodiment, the RF circuitry of the first hub operates at a frequency band greater than 5 GHz. The transmitter and the receiver (or transmitter and receiver functionality of a transceiver) of each wireless device of the first plurality of nodes also operates at a frequency band greater than 5 GHz in order minimize the third time period for causing RF circuitry of the transmitter and the fourth time period for causing RF circuitry of the receiver for each wireless device to reduce power consumption of the wireless devices of the first plurality of nodes.

In one embodiment, an apparatus (e.g., hub 610, hub 720, hub 782, hub n, hub 820, hub 964, hub 984, hub 1882, etc.) for providing a wireless asymmetric network architecture with power management features includes a memory (e.g., memory 842, memory 961, memory 986, memory 1886) for storing instructions, processing logic (e.g., one or more processing units, processing logic 844, processing logic 963, processing logic 988, processing logic 1888) to execute instructions to establish and control communications in the wireless asymmetric network architecture, and radio frequency (RF) circuitry (e.g., RF circuitry 850, RF circuitry 970, RF circuity 992, RF circuitry 1890) to transmit and receive communications in the wireless asymmetric network architecture. The RF circuitry transmits communications to a plurality of sensor nodes each having at least one sensor and a wireless device with a transmitter and a receiver (or transmitter and receiver functionality of a transceiver) to enable bi-directional communications with the RF circuitry of the apparatus in the wireless asymmetric network architecture. The one or more processing units execute instructions to determine a scheduled timing of operating at least one sensor node during a first time period that is close in time with respect to a transmit window of the transmitter (or transmitter functionality of a transceiver) and during a second time period that is close in time with respect to a receive window of the receiver (or receiver functionality of a transceiver) for at least one wireless device to reduce power consumption of the at least one wireless device of the first plurality of sensor nodes.

In one example, the apparatus is powered by a mains electrical source and the plurality of sensor nodes are each powered by a battery source or another energy source (not mains electrical source) to form the wireless asymmetric network architecture.

In one embodiment, the processing logic (e.g., one or more processing units) execute instructions to determine a scheduled timing of a transmit window of the transmitter and a receive window of the receiver for the at least one wireless device based on a timing of receiving a communication from the at least one wireless device of the plurality of sensor nodes.

In one embodiment, the at least one wireless device of at least one sensor node operates at a first power consumption level for the first and second time periods. The at least one sensor node operates at a second power consumption level when outside of the first and second time periods. In this example, the first power consumption level has more power consumption than the second power consumption level.

In a more specific embodiment, the at least one wireless device of at least one sensor node operates at a first clock speed for the first and second time periods. The at least one sensor node operates at a second clock speed when outside of the first and second time periods. The second clock speed is a reduced clock speed to reduce power consumption of the at least sensor node in comparison to the first clock speed.

In one example, the wireless asymmetric network architecture includes at least one of a wireless tree asymmetric network architecture or a wireless tree and mesh asymmetric network architecture.

Figure 16:
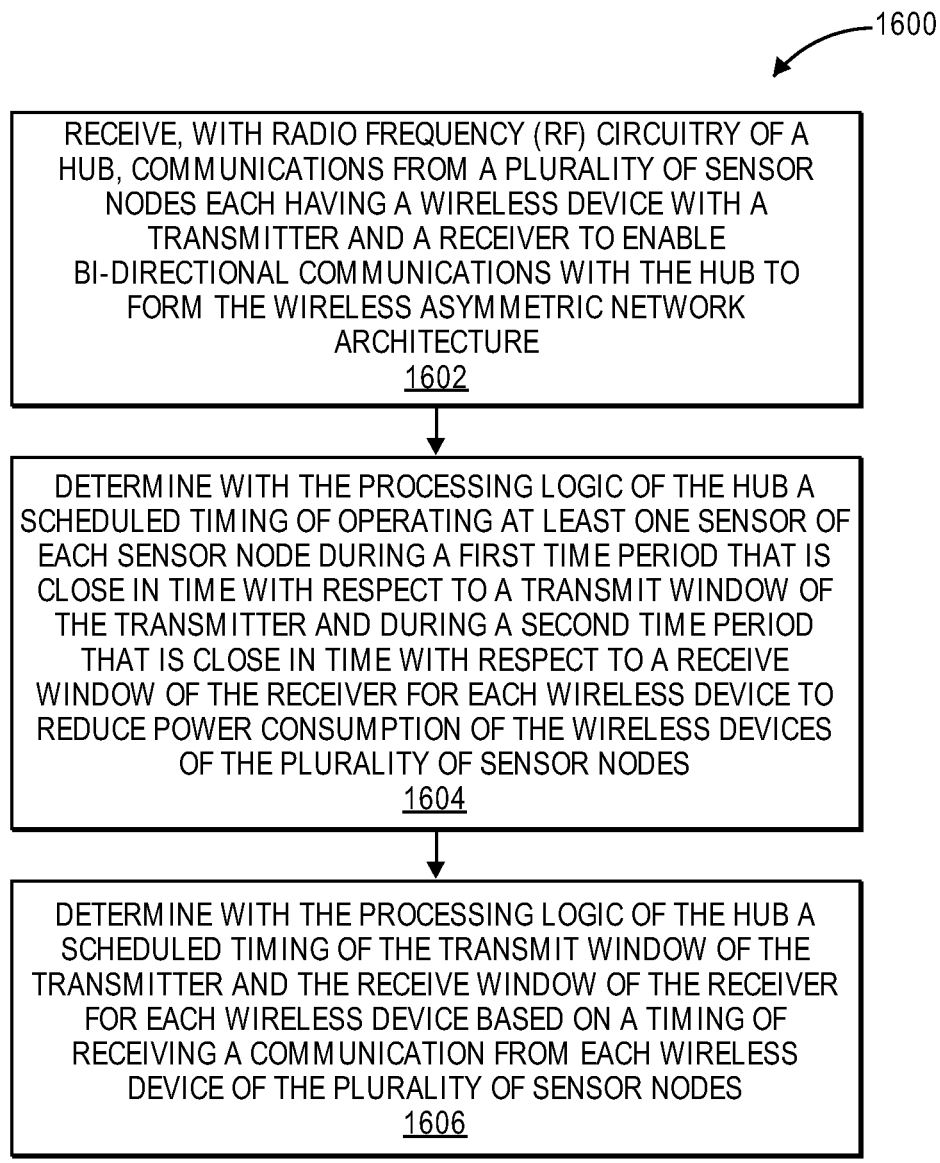
FIG. 16 illustrates a flow chart for a method of providing a wireless asymmetric network architecture with a hub having power management features in accordance with one embodiment.

FIG. 16 illustrates a flow chart for a method of providing a wireless asymmetric network architecture with a hub having power management features in accordance with one embodiment. The operations of method 1600 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1600.

At operation 1602, a method for reducing power consumption in a wireless asymmetric network architecture includes receiving, with radio frequency (RF) circuitry of a hub, communications from a plurality of sensor nodes each having a wireless device with a transmitter and a receiver (or transmitter and receiver functionality of a transceiver) to enable bi-directional communications with the hub to form the wireless asymmetric network architecture. At operation 1604, the processing logic of the hub determines a scheduled timing of operating at least one sensor of each sensor node during a first time period that is close in time with respect to a transmit window of the transmitter (or transmitter functionality of a transceiver) and during a second time period that is close in time with respect to a receive window of the receiver (or receiver functionality of a transceiver) for each wireless device to reduce power consumption of the wireless devices of the plurality of sensor nodes.

In one example, the hub is powered by a mains electrical source and the plurality of nodes are each powered by a battery source or another energy source (not mains electrical source) to form the wireless asymmetric network architecture.

At operation 1606, the processing logic of the hub determines a scheduled timing of the transmit window of the transmitter and the receive window of the receiver for each wireless device based on a timing of receiving a communication from each wireless device of the plurality of sensor nodes.

In one embodiment, each sensor node operates at a first power consumption level for the first and second time periods. Each sensor node operates at a second power consumption level when outside of the first and second time periods. In this example, the first power consumption level has more power consumption than the second power consumption level.

In a more specific embodiment, each sensor node operates at a first clock speed for the first and second time periods. Each sensor node operates at a second clock speed when outside of the first and second time periods. In this example, the second clock speed is a reduced clock speed to reduce power consumption of each sensor node in comparison to the first clock speed.

In one embodiment, the wireless asymmetric network architecture includes a wireless tree asymmetric network architecture. In another embodiment, the wireless asymmetric network architecture includes a wireless tree and mesh asymmetric network architecture.

Embodiments of the present invention provide improvements in the overall battery life offered by nodes of a wireless sensor network in indoor and nearby environments. In one embodiment, this may additionally be achieved by implementing energy harvesting in the battery operated terminal nodes, any battery operated node, or any node with an alternative energy source with no connection to electrical mains. Energy harvesting may be achieved using vibrational harvesting, light energy harvesting, thermal energy harvesting, wireless energy harvesting and/or other such energy harvesting techniques. In vibrational energy harvesting, vibrations in the environment of the sensor nodes could be used to stimulate motion of a mass within the sensor node system. This could be used to generate electrical energy, for example, by causing the deflection of a piezo-electric structure, or by moving a magnet relative to a coil. The resulting electrical energy could then be stored in a capacitor, or could be used to charge a battery within the sensor node.

Figure 19:
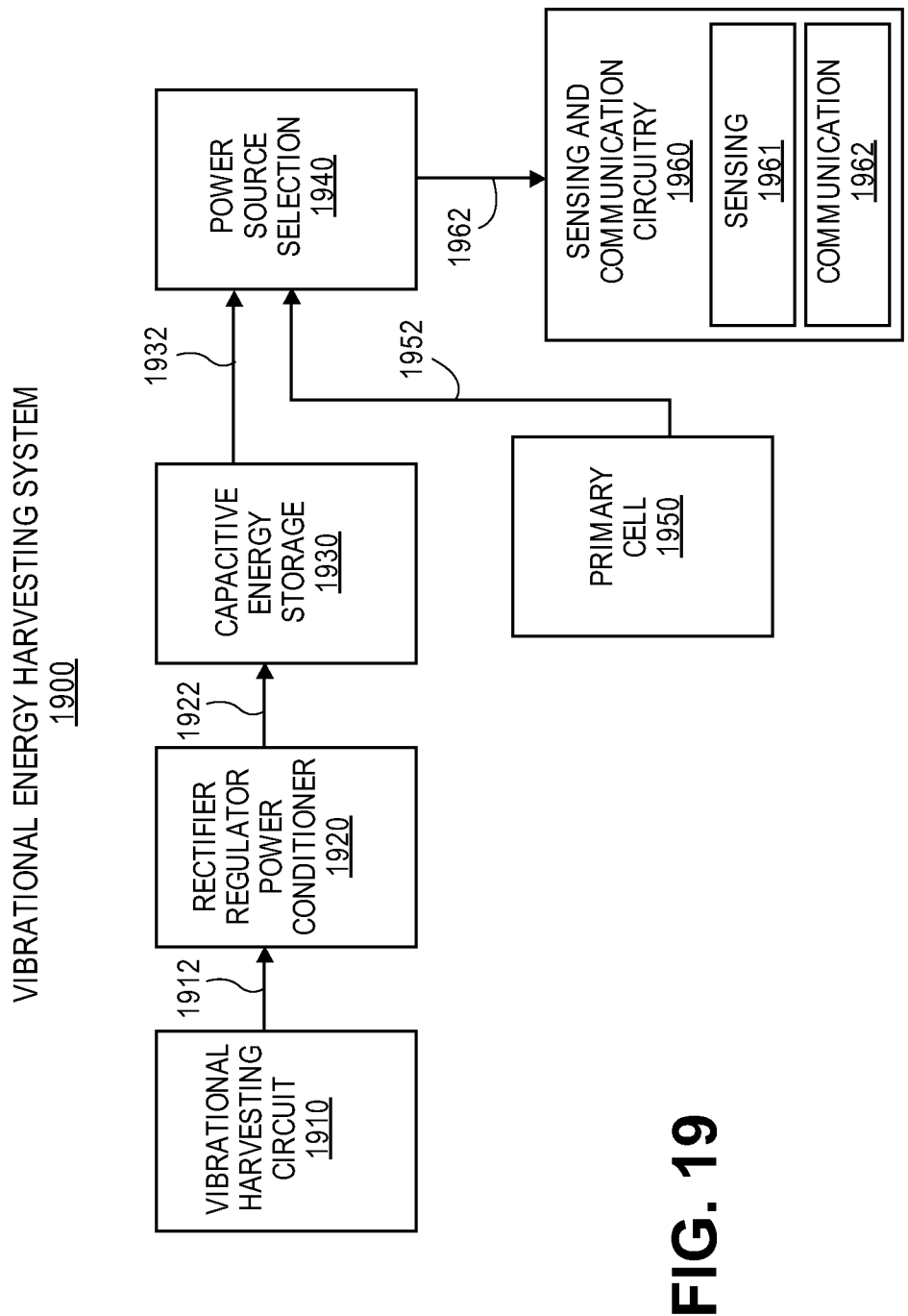
FIG. 19 illustrates a block diagram of a vibrational energy harvesting system for providing a supplemental energy source to a sensor node in accordance with one embodiment.

FIG. 19 illustrates a block diagram of a vibrational energy harvesting system for providing a supplemental energy source to a sensor node in accordance with one embodiment. A vibrational energy harvester circuit 1910 may include a piezoelectric generator or an electromagnetic proof mass system, in which vibration causes the motion of a coil relative to a magnet and this is used to generate electrical power, which is provided to a rectifier regulator power conditioning block 1920. This block 1920 includes one or more circuits for the rectifying, regulating, and power conditioning functionality. This block 1920 receives the irregular and/or alternating current generated by the harvester via a connection 1912 (e.g., communication link, signal line, electrical connection, etc.), rectifies and filters the irregular and/or alternating current, and regulates it to a suitable voltage for use within the sensor node. The output of the block 1920 is then provided to capacitive energy storage block 1930 via a connection 1922. The capacitive energy storage block 1930 includes at least one storage capacitor, which stores the harvested energy as a supplemental energy source for use by sensing and communication circuitry 1960 of a sensor node. The sensing and communication circuitry 1960 includes sensing circuitry 1961 and communication circuitry 1962. A power selector block 1940 having a selecting mechanism is then used to select harvested power from the at least one storage capacitor when available via a connection 1932, or use power supplied from a primary cell battery source 1950 via a connection 1952. In this manner, energy harvesting may be used in conjunction with a non-rechargeable battery (i.e., the primary cell battery source 1950) to supplement battery-provided power for sustaining operations of the sensor node including operations of the sensing and communication circuitry 1960.

Alternatively, in another embodiment, the system could be configured to use a rechargeable battery; in this case, the harvester may be alternatively used to charge the battery. FIG. 20 illustrates a block diagram of a vibrational energy harvesting system for charging a rechargeable battery of a sensor node in accordance with another embodiment. A vibrational energy harvester circuit 2010 may include a piezoelectric generator or an electromagnetic proof mass system, in which vibration causes the motion of a coil relative to a magnet and this is used to generate electrical power, which is provided to a rectifier regulator power conditioning battery charger block 2020. This block 2020 includes one or more circuits for the rectifying, regulating, power conditioning, and battery charger functionality. This block 2020 receives the irregular and/or alternating current generated by the harvester via a connection 2012 (e.g., communication link, signal line, electrical connection, etc.), rectifies and filters the irregular and/or alternating current, and regulates it to a suitable voltage for use within the sensor node. The output of the block 2020 is then provided to a rechargeable cell battery source 2030 via a connection 2022. The rechargeable cell battery source 2030 provides power to the sensing and communication 2060 of a sensor node via a connection 2032. The sensing and communication circuitry 2060 includes sensing circuitry 2061 and communication circuitry 2062. In this manner, energy harvesting may be used to charge a rechargeable battery (i.e., the rechargeable cell battery source 2030) to supplement battery-provided power for sustaining operations of the sensor node including operations of the sensing and communication circuitry 2060.

In light energy harvesting, photovoltaic cells could be used to produce electrical energy from incident light, including sunlight, indoor lighting, outdoor artificial lighting, and other such lighting sources. The resulting electrical energy could then be stored in a capacitor, or could be used to charge a battery within a sensor node. FIG. 21 illustrates a block diagram of a photovoltaic energy harvesting system for charging a rechargeable battery of a sensor node in accordance with one embodiment. A photovoltaic energy harvesting circuit 2110 includes a photovoltaic generator, which may contain one or more photovoltaic cells for generating electrical power. The photovoltaic energy harvesting circuit 2110 is coupled to a power conditioner battery charger block 2120 via a connection 2112. The output electrical power of the circuit 2110 is conditioned by a power conditioner of the power conditioner battery charger block 2120 and used to charge a rechargeable battery cell 2130. The power conditioner battery charger block 2120 is coupled to the rechargeable battery cell 2130 via a connection 2122. The rechargeable battery cell 2130 in turn then provides power for the operation of the sensing and communication circuitry 2140 of the sensor node via a connection 2132. The sensing and communication circuitry 2140 includes sensing circuitry 2141 and communication circuitry 2142. In this manner, the battery life may be extended by exploiting energy harvesting. For example, energy harvesting may be used to compensate for the self-discharge of the battery source. In another example, energy harvesting may be used to trickle charge a cell that is normally not designed for secondary cell usage.

In thermal energy harvesting, electrical energy could be produced by using a thermoelectric device to convert available thermal energy into electrical energy. This could then be stored in a capacitor, or could be used to charge a battery within the sensor node.

In wireless energy harvesting, incident radio-frequency energy could be extracted using an antenna, rectified, and then used to charge a capacitor or battery within the sensor node. The source of RF energy could be WiFi at 2.4 Gz or 5 GHz, DECT at 1.8 GHz or any other RF signal available for extraction at the sensor node. In one embodiment, the RF signal could be intentionally supplied to the terminal nodes by hubs or by RF generators placed within the physical coverage region of the wireless sensor network.

In one embodiment, the energy from energy harvesting could be stored in a capacitor, which could be used to supplement energy drawn from the battery during operation. In another embodiment, the energy from the energy harvesting could be used to re-charge the battery. In this embodiment, the battery could be either a rechargeable battery designed specifically for recharging, or could be a primary cell, typically not intended for recharging. In embodiments with rechargeable batteries, energy harvesting could be used to avoid deep discharge of the battery, thus prolonging battery life.

In embodiments with primary cells, harvested energy could be used to trickle charge the battery, thus increasing effective battery capacity, for example, by compensating for energy drawn from the battery during operation, or lost due to self-discharge of the battery. In one embodiment, trickle charging of the battery could be kept at a sufficiently low level to avoid damage to the battery. In another embodiment, pulsed charging could be used to prevent damage to the battery.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 17:
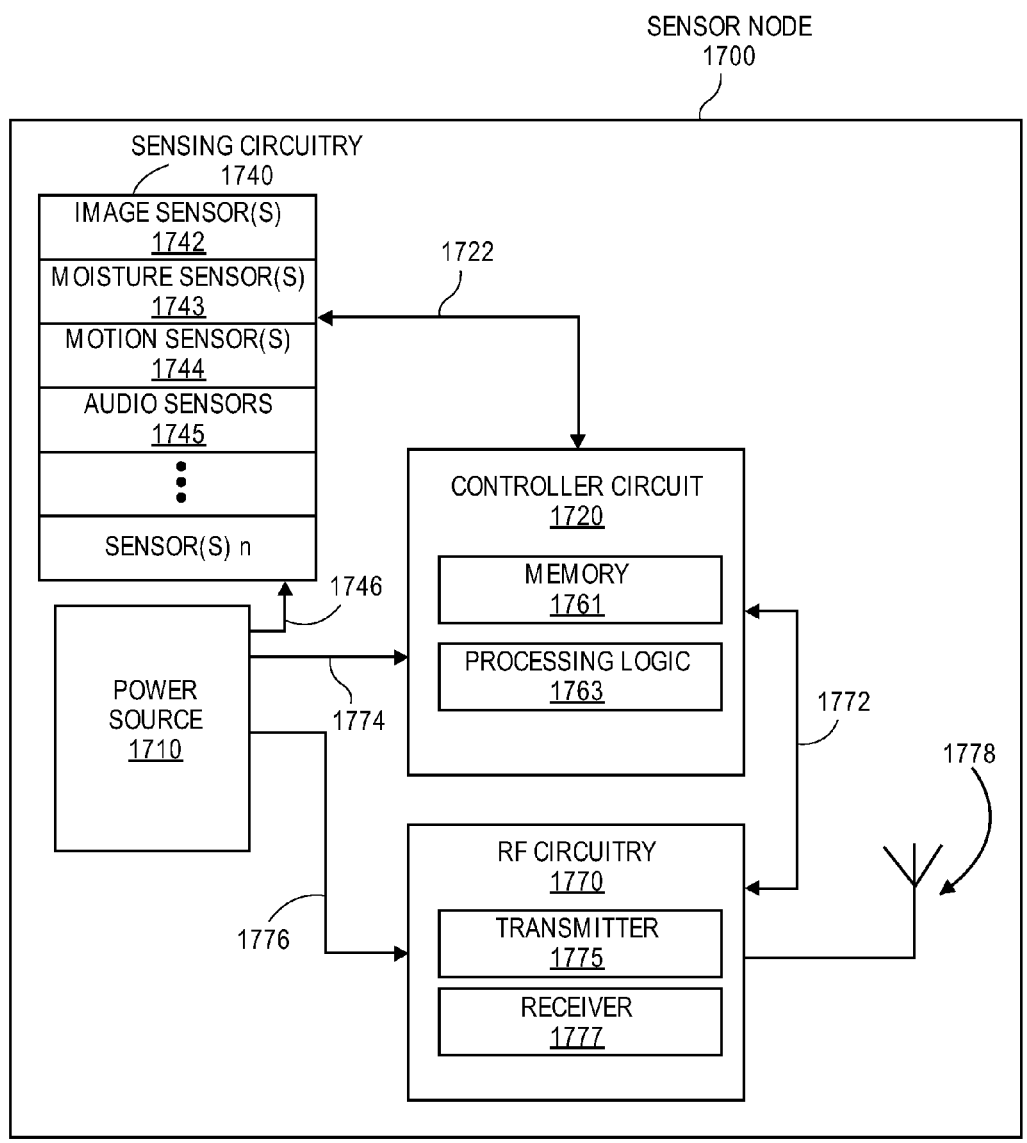
FIG. 17 illustrates a block diagram of a sensor node in accordance with one embodiment.

FIG. 17 illustrates a block diagram of a sensor node in accordance with one embodiment. The sensor node 1700 includes a power source 1710 (e.g., energy source, battery source, primary cell 1950, rechargeable cell 2030, rechargeable cell 2130, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, sensor(s) and circuitry n, etc.

In one embodiment, the sensing circuitry and RF circuitry are integrated (e.g., sensing and communication circuitry 1960, 2060, 2140). In another embodiment, the sensing and communication circuitry 1960, 2060, and 2140 of FIGS. 19, 20, and 21 are separately located in at least one of a sensing circuitry 1740, a controller circuit 1720, and a RF circuitry 1770 of FIG. 17. In one example, the sensing circuitry (e.g., 1961, 2061, 2141) is located in or integrated with sensing circuitry 1740 and the communication circuitry 1962, 2062, and 2142 is located in or integrated with RF circuitry 1770 or controller circuit 1720.

In one embodiment, the components of the vibrational energy harvesting system 1900 and 2000 and light energy harvesting system 2100 are integrated with the sensor node 1700. For example, the vibrational harvesting circuit 1910, rectifier regulator power conditioner 1920, and capacitive energy storage 1930 are coupled to the power source selection 1940 which is coupled to the primary cell 1950 (e.g., power source 1710) and the sensing and communication circuitry 1960 (e.g., sensing circuitry 1740 and RF circuitry 1770). In another example, the vibrational harvesting circuit 1910, rectifier regulator power conditioner 1920, capacitive energy storage 1930, power source selection 1940, and primary cell 1950 are integrated with the power source 1710.

In another example, the vibrational harvesting circuit 2010 and rectifier regulator power conditioner battery charger 2020 is coupled to the rechargeable 2030 cell (e.g., power source 1710) or the vibrational harvesting circuit 2010 and rectifier regulator power conditioner battery charger 2020 are integrated with the power source 1710.

In another example, the photovoltaic harvester circuit 2110 and power conditioner battery charger 2120 is coupled to the rechargeable 2130 cell (e.g., power source 1710) or the photovoltaic harvester circuit 2110 and power conditioner battery charger 2120 are integrated with the power source 1710.

The sensor node 1700 can be a wireless device 1700 or the controller circuit 1720, RF circuitry 1770, sensing circuitry 1740, and antenna(s) 1778 in combination may form the wireless device as discussed herein.

In one embodiment, a sensor node (e.g., wireless device) for a wireless asymmetric network architecture includes at least one sensor, a memory for storing instructions, and processing logic coupled to the memory and the at least one sensor. The processing logic to execute instructions for processing data received from the at least one sensor and for processing communications for the sensor node. The sensor node also includes a radio frequency (RF) circuitry coupled to the processing logic. The RF circuitry includes transmitter and receiver functionality (of a transmitter and receiver, respectively, or of a transceiver) to transmit communications to a hub and to receive communications from the hub in the wireless asymmetric network architecture. The processing logic is configured to execute instructions of a scheduled timing to cause the transmitter functionality to be operable to transmit and to cause the receiver functionality to be operable to receive to reduce power consumption of the sensor node.

In one example, the sensor node is powered by a battery source or another energy source (not electrical mains source).

In one embodiment, the instructions of the scheduled timing are received from the hub based on a timing of a communication being transmitted from the sensor node to the hub. In another embodiment, the scheduled timing is determined at least partially by the sensor node or another sensor node.

In one embodiment, the transmitter functionality is operable for transmitting less than 5 percent of a first time period and the receiver functionality is operable for receiving less than 5 percent of the first time period. In one example, the transmitter functionality is operable for transmitting less than 1 percent of a first time period and the receiver functionality is operable for receiving less than 1 percent of the first time period.

In one embodiment, the RF circuitry of the sensor node operates at a frequency band greater than 2.4 GigaHertz to minimize a time period for transmitting in a transmit mode. In another embodiment, the RF circuitry of the sensor node operates at a frequency band greater than 6 GigaHertz to minimize a time period for transmitting in a transmit mode.

In one embodiment, a sensor node for a wireless asymmetric network architecture includes at least one sensor, a memory for storing instructions, processing logic coupled to the memory and the at least one sensor. The processing logic executes instructions for processing data received from the at least one sensor and for processing communications for the sensor node. The sensor node also includes radio frequency (RF) circuitry coupled to the processing logic. The RF circuitry includes transmitter and receiver functionality (of a transmitter and a receiver, respectively, or of a transceiver) to transmit communications to a hub and to receive communications from the hub in the wireless asymmetric network architecture. The processing logic is configured to execute instructions to determine a scheduled timing of operating at least one sensor node during a first time period that is close in time with respect to a transmit window of the transmitter functionality and during a second time period that is close in time with respect to a receive window of the receiver functionality to reduce power consumption of the sensor node.

In one example, the first time period is approximately the same time period as the transmit window and the second time period is approximately the same time period as the receive window. In another example, the first time period starts just prior to a time period of the transmit window and completes just after the transmit window. The first time period may be 1-10% longer than the time period of the transmit window. The second time period starts just prior to a time period of the receive window and completes just after the receive window. The second time period may be 1-10% longer than the time period of the receive window.

In one example, the sensor node is powered by a battery source or another energy source (not mains electrical source).

In one embodiment, the sensor node to operate with a battery source and energy from energy harvesting is stored either directly in the battery if it is rechargeable, or in a capacitor coupled to the sensor node or integrated with the sensor node. The energy from energy harvesting is used to supplement energy drawn from the battery source during operation.

In one embodiment, the sensor node operates at a first power consumption level for the first and second time periods. The sensor node can operate at a second power consumption level when outside of the first and second time periods. In this example, the first power consumption level has more power consumption than the second power consumption level.

In one embodiment, a sensor node for a wireless asymmetric network architecture includes at least one sensor, a memory for storing instructions, and processing logic coupled to the memory and the at least one sensor. The processing logic to execute instructions for processing data (e.g., image data, motion data, moisture data, temperature data, etc.) received from the at least one sensor and for processing communications received or to be transmitted for the sensor node. The sensor node also includes radio frequency (RF) circuitry coupled to the processing logic. The RF circuitry includes transmitter and receiver functionality to transmit communications to a hub and to receive communications from the hub in the wireless asymmetric network architecture. The processing logic is configured to process a communication received from a hub that indicates a transmit window for the transmitter functionality and a receive window for the receiver functionality of the sensor node to provide anti-collision features to avoid collisions of communications in the wireless asymmetric network architecture.

In one example, the sensor node is powered by a battery source or another energy source.

In one embodiment, the processing logic is configured to execute instructions to process the communication received from the hub that indicates a shift of a next transmit window and next receive window for the sensor node. The processing logic can also be configured to execute instructions to generate at least one random number and to shift at least one of a future transmit window and/or a future receive window for the sensor node based on the at least one random number when the hub determines that collision has occurred for communications received from the sensor node and another node.

In one embodiment, a machine-accessible non-transitory medium (e.g., memory) contains executable computer program instructions which when executed by a data processing system cause the system to perform any of the methods discussed herein. While the machine-accessible non-transitory medium is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

An apparatus (e.g., hub 610, hub 720, hub 782, hub n, hub 820, hub 964, hub 984, hub 1882, etc.) for providing a wireless asymmetric network architecture with power management features includes a memory (e.g., memory 842, memory 961, memory 986, memory 1886) for storing instructions, processing logic (e.g., one or more processing units, processing logic 844, processing logic 963, processing logic 988, processing logic 1888) to execute instructions to establish and control communications in the wireless asymmetric network architecture, and radio frequency (RF) circuitry (e.g., RF circuitry 850, RF circuitry 970, RF circuity 992, RF circuitry 1890)

In one embodiment, an apparatus (e.g., hub 610, hub 720, hub 782, hub n, hub 820, hub 964, hub 984, hub 1882, etc.) is a wireless control device or includes a wireless control device for providing a wireless asymmetric network architecture. The apparatus includes memory (e.g., memory 842, memory 961, memory 986, memory 1886) for storing instructions, processing logic (e.g., one or more processing units, processing logic 844, processing logic 963, processing logic 988, processing logic 1888) to execute instructions to establish and control communications in the wireless asymmetric network architecture, and RF circuitry (e.g., transceiver, RF circuitry 850, RF circuitry 970, RF circuity 992, RF circuitry 1890) to transmit and receive communications in the wireless asymmetric network architecture. The RF circuitry transmits communications to a plurality of nodes each having a wireless device with a transmitter and a receiver to enable bi-directional communications with the RF circuitry in the wireless asymmetric network architecture. The processing logic is configured to execute instructions to determine a scheduled timing of causing the transmitter to be operable to transmit and causing the receiver to be operable to receive for each wireless device to reduce power consumption of the wireless devices of the plurality of nodes.

In one example, the apparatus is powered by a mains electrical source and the plurality of nodes are each powered by a battery source or another energy source (not mains electrical source) to form the wireless asymmetric network.

The scheduled timing of powering the transmitter and powering the receiver for each wireless device is determined based on a timing of communications between the transceiver of the apparatus and each wireless device of the nodes. In one example, the scheduled timing of causing the receiver to be operable to receive for at least one wireless device of a terminal node of the nodes (or other nodes) is determined based on a timing of a communication being transmitted from the at least one wireless device to the RF circuitry of the apparatus.

In another example, the apparatus is aware of when the receivers of the wireless devices of the nodes are active (e.g., in receive mode) based on the timing of the transmitted communications from the wireless devices of the nodes to the apparatus. For example, if a transmitter of a wireless device transmits a communication to the apparatus, then the apparatus will know that a receiver of this wireless device, which can be a terminal node or other node, will be active for a certain time period after the communication is transmitted to the apparatus.

In one embodiment, the transmitter for each wireless device is operable for transmitting less than a certain percentage (e.g., 5 percent, 1 percent) of a time period and the receiver for each wireless device is operable for receiving less than a certain percentage (e.g., 5 percent, 1 percent) of the time period.

In one example, the wireless asymmetric network architecture includes at least one of a wireless tree asymmetric network architecture or a wireless tree and mesh asymmetric network architecture.

Figure 18:
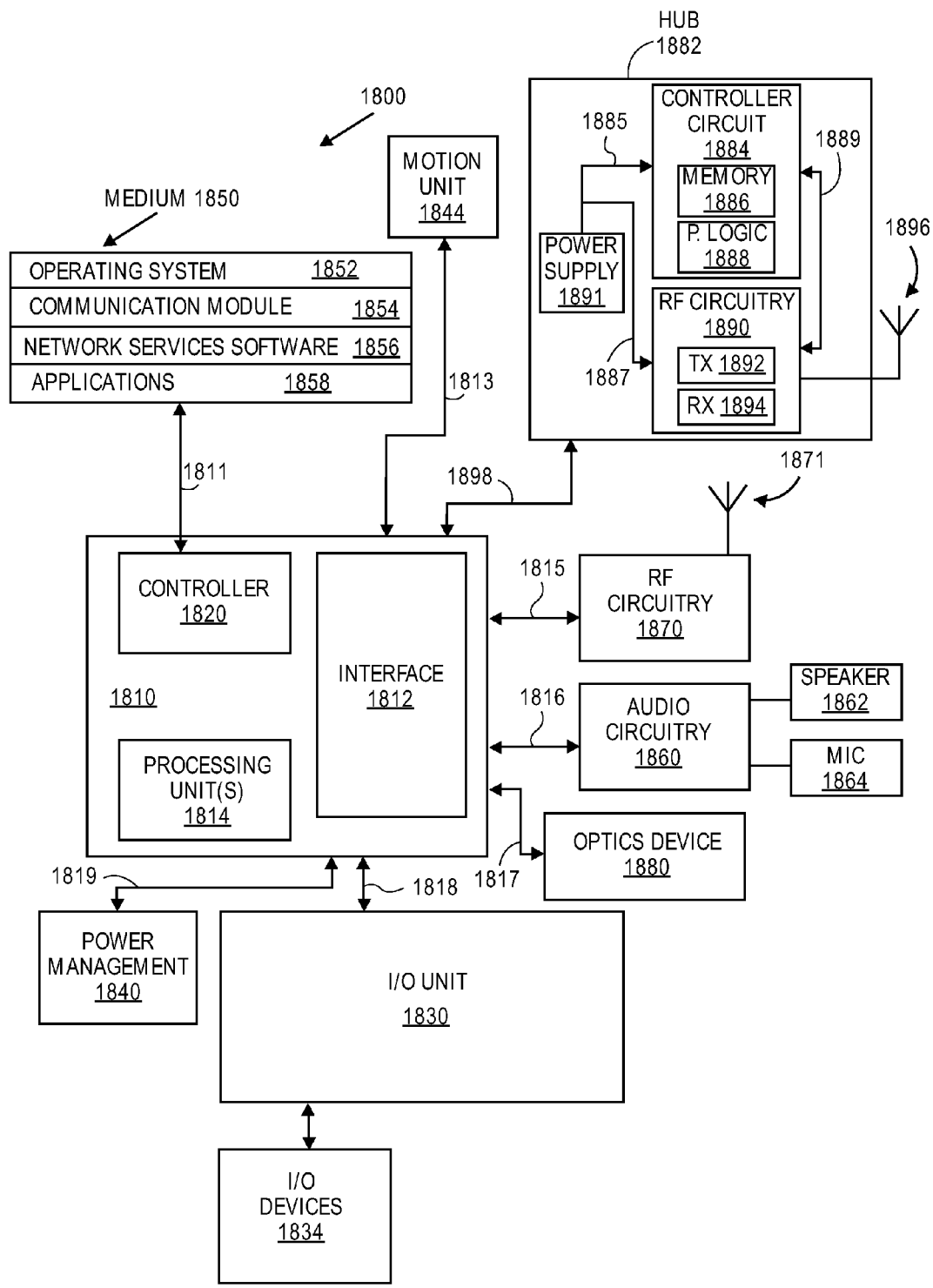
FIG. 18 illustrates a block diagram of a system or appliance 1800 having a hub in accordance with one embodiment.

FIG. 18 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g, an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for providing a wireless asymmetric network, comprising:
    a first hub having one or more processing units and a first antenna for transmitting and receiving communications in the wireless asymmetric network;
    a second hub having one or more processing units and a second antenna for transmitting and receiving communications in the wireless asymmetric network; and
    a plurality of sensor nodes each having a wireless device with a transmitter and a receiver to enable bi-directional communications with the first and second hubs in the wireless asymmetric network architecture, wherein the one or more processing units of the first and second hubs are configured to execute instructions to receive communications from each sensor node including time of arrival information from each sensor node, to identify shortest direct paths for distances between the plurality of sensor nodes and the first and second hubs in a multi-path environment using the time of arrival information, to synchronize the first and second hubs with each other and share location information of the plurality of sensors nodes, and to triangulate from distances measured via the shortest direct paths to determine location information including location for the plurality of sensor nodes.

2. The system of claim 1, wherein the first hub is powered by a mains electrical source and the plurality of sensor nodes are each powered by a battery source to form the wireless asymmetric network, wherein an asymmetry of available power for the first hub and the plurality of sensor nodes is exploited to enhance battery life and communication range in a wireless sensor network of the plurality of sensor nodes based on low-duty cycle networking to reduce transmission-related energy consumption of the plurality of sensor nodes in the wireless sensor network.

3. The system of claim 1, wherein the location information for each sensor node has a location precision of 3 meters (m) or less with the location precision being designed based on an application of a sensor network that is formed with the plurality of sensor nodes.

4. The system of claim 1, wherein the one or more processing units of the first and second hubs are configured to execute instructions to determine location information for the plurality of sensor nodes based on triangulating from distances measured via strength of signal information that is associated with the received communications.

5. The system of claim 1, wherein the wireless asymmetric network architecture comprises a wireless tree asymmetric network architecture.

6. The system of claim 1, wherein the wireless asymmetric network architecture comprises a wireless tree and mesh asymmetric network architecture.

7. The system of claim 1, wherein the one or more processing units of the second hub are configured to execute instructions to send communications to the first hub and to receive communications from the first hub for controlling and monitoring the wireless asymmetric network architecture.

8. The system of claim 1, wherein the first antenna of the first hub and the second antenna of the second hub to transmit ultra-wide band (UWB) communications to the plurality of sensor nodes and to receive UWB communications from the plurality of sensor nodes.

9. A hub for providing a wireless asymmetric network architecture, comprising:
    a memory for storing instructions;

one or more processing units to execute instructions to establish and control communications in the wireless asymmetric network architecture; and radio frequency (RF) circuitry including multiple antennas to transmit and receive communications in the wireless asymmetric network architecture, the RF circuitry including multiple antennas to transmit communications to a plurality of sensor nodes each having a wireless device with a transmitter and a receiver to enable bi-directional communications with the RF circuitry of the apparatus in the wireless asymmetric network architecture, wherein the one or more processing units are configured to execute instructions to receive on each antenna of the RF circuitry of the hub communications from each sensor node including time of arrival information from each sensor node, to identify the shortest direct paths for distances between the plurality of sensor nodes and the hub in a multi-path environment using the time of arrival information, and to triangulate from distances measured via the shortest direct paths to determine location information including location for the plurality of sensor nodes.

10. The hub of claim 9, wherein the apparatus is powered by a mains electrical source and the plurality of sensor nodes are each powered by a battery source or another energy source to form the wireless asymmetric network.

11. The hub of claim 9, wherein the one or more processing units are configured to execute instructions to determine location information for the plurality of sensor nodes based on at least one of angle of arrival information, signal strength information, and time of arrival information for the communications from the plurality of sensor nodes.

12. The hub of claim 11, wherein the one or more processing units are configured to execute instructions to determine location information for the plurality of sensor nodes based on angle of arrival information for determining an angle of arrival with a strongest signaling component and combined with information to identify a shortest direct path between the apparatus and each sensor node in a multi-path environment, which is determined from time of arrival information, for the communications from the plurality of sensor nodes.

13. The hub of claim 9, wherein the wireless asymmetric network architecture comprises at least one of a wireless tree asymmetric network architecture or a wireless tree and mesh asymmetric network architecture.

14. The hub of claim 9, wherein the multiple antennas of the RF circuitry to transmit ultra-wide band (UWB) communications to the plurality of sensor nodes and to receive UWB communications from the plurality of sensor nodes.

15. A method for determining location in a wireless asymmetric network architecture, comprising:

transmitting, with radio frequency (RF) circuitry including multiple antennas of a hub, communications to a plurality of sensor nodes in the wireless asymmetric network architecture;

receiving, with the RF circuitry including each of the multiple antennas of the hub, communications including time of arrival information from each of the plurality of sensor nodes each having a wireless device with a transmitter and a receiver to enable bi-directional communications with the RF circuitry of the hub in the wireless asymmetric network architecture;

identifying shortest direct paths for distances between the plurality of sensor nodes and the hub in a multi-path environment using the time of arrival information; and triangulating from distances measured via the shortest direct paths to determine location information including location for the plurality of sensor nodes.

16. The method of claim 15, wherein the hub is powered by a mains electrical source and the plurality of sensor nodes are each powered by a battery source, wherein the location information for each sensor node has a location precision of 1 meter (m) or less such that approximately no overlap occurs in the certainty of position of any two sensor nodes.

17. The method of claim 15, further comprising:

determining, with one or more processing units of the hub, location information for the plurality of sensor nodes based on at least one of angle of arrival information, signal strength information, and time of arrival information for the communications received from the plurality of sensor nodes.

18. The method of claim 17, wherein the one or more processing units are configured to execute instructions to determine location information for the plurality of sensor nodes based on angle of arrival information for determining an angle of arrival with a strongest signaling component and combined with information to identify a shortest direct path in a multi-path environment, which is determined from time of arrival information, for the communications from the plurality of sensor nodes.

19. The method of claim 15, wherein the wireless asymmetric network architecture comprises at least one of a wireless tree asymmetric network architecture or a wireless tree and mesh asymmetric network architecture.

20. The method of claim 15, wherein the multiple antennas of the hub to transmit ultra-wide band (UWB) communications to the plurality of sensor nodes and to receive UWB communications from the plurality of sensor nodes.

* * * * *